United States Patent [19]

Pratt

[11] Patent Number: 4,733,971
[45] Date of Patent: Mar. 29, 1988

[54] PROGRAMMABLE WEIGHT SENSITIVE MICROINGREDIENT FEED ADDITIVE DELIVERY SYSTEM AND METHOD

[75] Inventor: William C. Pratt, Canyon, Tex.

[73] Assignee: Micro Chemical, Inc., Amarillo, Tex.

[21] Appl. No.: 833,904

[22] Filed: Feb. 26, 1986

[51] Int. Cl.4 ............................................ B01F 15/04
[52] U.S. Cl. ........................................ 366/141; 141/83;
    141/104; 141/284; 222/57; 366/152; 414/21;
    414/294
[58] Field of Search ............... 366/141, 151, 152, 160,
    366/162, 16, 17, 18, 19, 20; 141/83, 104, 239,
    84; 414/21, 294, 282; 222/57, 77

[56] References Cited

U.S. PATENT DOCUMENTS

| | | |
|---|---|---|
| 2,587,531 | 2/1952 | Saxe ..................................... 414/21 |
| 2,608,394 | 8/1952 | Williamson . |
| 2,873,955 | 2/1959 | Sauer . |
| 2,877,524 | 3/1959 | Bishop ................................ 366/141 |
| 2,893,602 | 7/1959 | Barber et al. . |
| 3,203,591 | 8/1965 | Daulton et al. . |
| 3,437,075 | 4/1969 | Hawes, Jr. et al. . |
| 3,498,311 | 3/1970 | Hawes, Jr. . |
| 3,595,328 | 7/1971 | Griem, Jr. . |
| 3,670,923 | 6/1972 | Hawes et al. . |
| 3,720,185 | 3/1973 | Aldous et al. . |
| 3,806,001 | 4/1974 | Pratt . |
| 3,822,056 | 7/1974 | Hawes et al. . |
| 3,959,636 | 5/1976 | Johnson et al. . |
| 4,117,954 | 10/1978 | Pelletier . |
| 4,181,097 | 1/1980 | Betsuno . |

OTHER PUBLICATIONS

*Feed Management Magazine*, Mar. 1985, vol. 36, No. 3, pp. 54–58, "Micro-Systems".

"The Hough Micro Weighing System", brochure of Hough Kenebec International of West Hartford, Conn., undated.

"The Hickman Micro System", 4–page brochure of Hickman's Micro System, Inc. of Gordo, Ala., undated.

"Automated Pre-Mix System", 1–page advertisement of Agra Products International, Inc., undated.
"All-Digital Loss-In-Weight Feeding", pp. 4–5 from a K-Tron Corporation Publication, undated.
"System Responsibility . . . From Bulk Storage to the Precision Metering of Dry Materials", 5 pages, Acrison, Inc., publication.
"Prater Blue Streak Feed Processor, The Accurate One!" 2–page advertisement, undated.
"Weigh-Tronix's Revolutionary SFM-200 Ration Master Stationary Feed Mixer", 2–page advertisement (undated).
*Feed Management Magazine*, Jul. 1986, vol. 37, No. 7, pp. 20, 22, 24 "Micro-Ingredient Control".

*Primary Examiner*—Robert W. Jenkins
*Attorney, Agent, or Firm*—Klarquist, Sparkman, Whinston

[57] ABSTRACT

A method and apparatus whereby livestock and poultry are administered feed additives in their feed ration. In one disclosed form, the apparatus stores additive concentrates separately until just prior to use, then on demand dispenses the additive concentrates separately and sequentially into a weigh hopper for sequential, cumulative weighing therein. The weighed contents of the weigh hopper are deposited into a liquid carrier within a mixing vessel where the dispensed additives are diluted, suspended, and dispersed by mixing. The resulting carrier-and-additive slurry is pumped to a receiving station for mixing with a feed ration. The weigh hopper is isolated from movements that would affect additive weight determinations during the weighing process so that accurate measurements of the additive weights are obtained. A computerized control system controls the operation and sequencing of the apparatus. In another disclosed form, the apparatus dispenses additive concentrates by weight directly into a mixing vessel by measuring the loss-of-weight of their respective storage containers. In still another disclosed form, the apparatus dispenses some additive concentrates by weight and others by volume into a mixing vessel.

94 Claims, 17 Drawing Figures

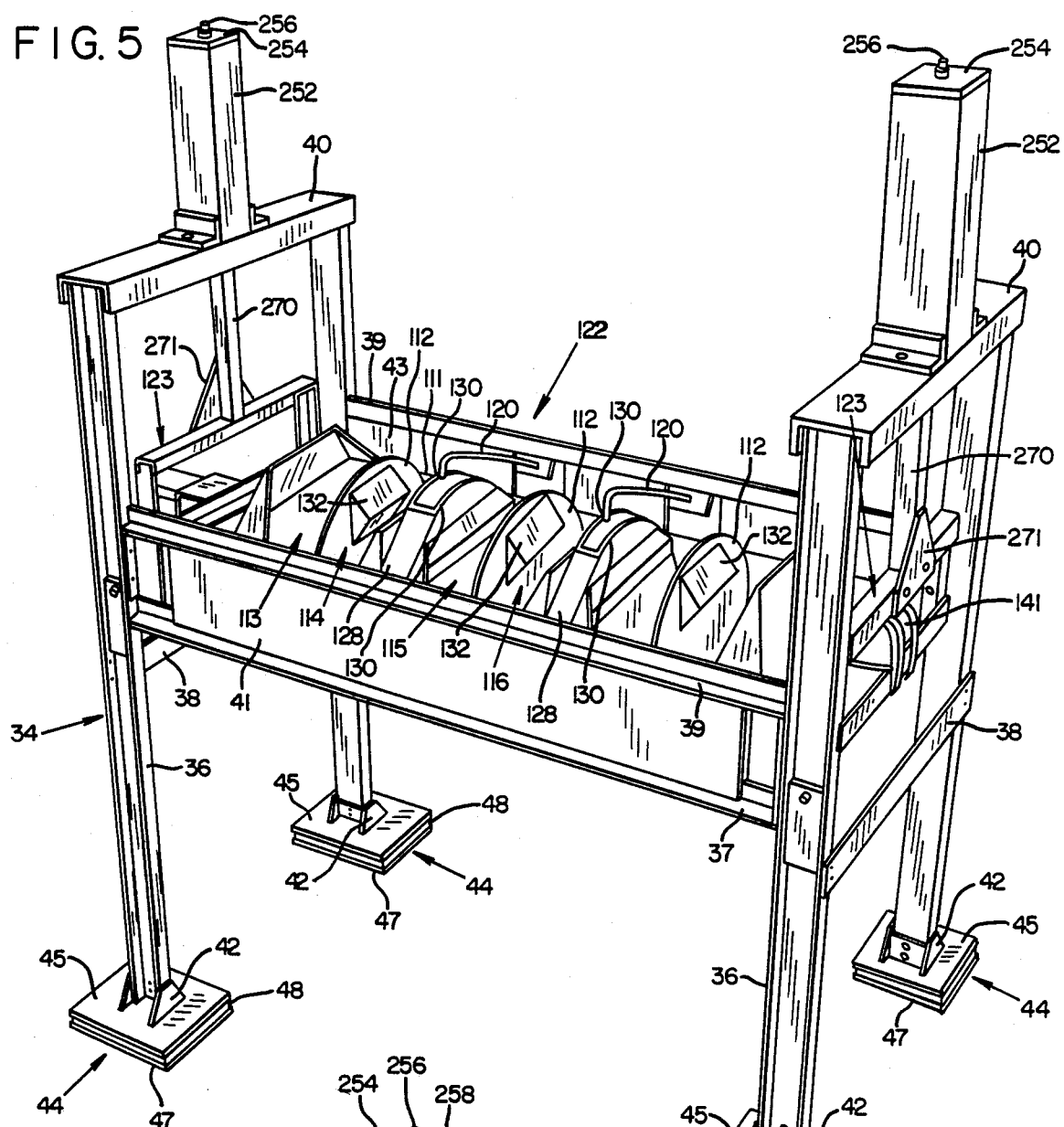
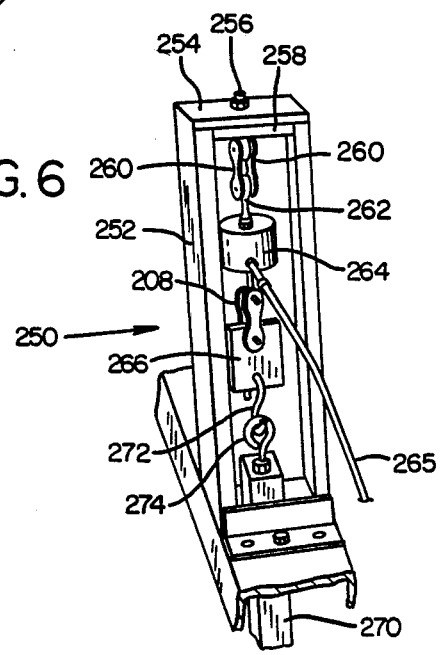

PROGRAMMABLE WEIGHT SENSITIVE MICROINGREDIENT FEED ADDITIVE DELIVERY SYSTEM AND METHOD

BACKGROUND OF THE INVENTION

1. Field of the Invention

The present invention relates to the administering of feed additives to livestock, and more particularly to a method and apparatus for supplementing the diets of livestock and poultry with feed additives such as nutrients and medicines supplied in a consumptive fluent carrier such as water.

2. General Discussion of the Background

It has long been a common practice to feed additive supplements to cattle and other livestock, including poultry. Such supplements include vitamins, minerals, proteins, enzymes, hormones, antibiotics, worm medicines, and other nutritional supplements and medications, which provide a balanced diet, protect the livestock from disease, and stimulate growth.

An early method of feeding additives to livestock involved the use of commercially prepared additive premixes. The additives were premixed together in dry form, with some dry diluting filler material, and then stored at the feedlot for a period of time until ready for use. The premix was either mixed with the feed ration before delivery to the animals or spread on the feed at the feed trough. Premixes suffer the drawbacks of being costly to buy, store and administer. They are difficult to mix evenly with the feed, and additives of different densities tend to segregate in premixes, increasing the chances that specific animals will receive too much or too little of a given additive. Too much of especially toxic additives can have dangerous or even lethal consequences.

Additives also tend to lose their potency in premixes through physical or chemical breakdown, especially if stored for a long period of time under changing environmental conditions in combination with other additives. Therefore, there is no assurance that livestock receive their intended dosages of specific additives when the additives are administered in premixes.

Premixes also limit the choices of additive combinations that livestock feeders can feed their animals to those combinations available commercially. They also limit a feedlot's flexibility to feed different groups of animals different combinations and dosages of additives to meet their differing needs.

Many of the foregoing problems were solved by the methods and apparatus of U.S. Pat. Nos. 3,437,075; 3,498,311; 3,822,056; 3,670,923; and 3,806,001, which are commonly assigned to the owner of the present application. These patents disclose various methods and apparatus for separately dispensing at the feedlot, separately stored livestock feed additive concentrates into a flow of fluent carrier material for dilution, dispersion and suspension, and for transporting the resulting slurry into livestock drinking water or feed rations shortly before the time of intended consumption. Each of these methods and apparatus, however, meter the desired amount of each feed additive on a volumetric basis. Volumetric metering can be inaccurate because of changes in the densities of additive concentrates caused by variations in humidity, particle size, moisture content, flow characteristics, temperature, oil content and other factors. Even minor inaccuracies in the amount of additive concentrates dispensed can cause serious problems, since some of the additives are very potent, toxic drugs. Typically, only 10 to 100 grams of a given additive concentrate are dispersed in a ton of feed. Volumetric metering is only accurate to within 1–2% even under the best of conditions.

Therefore, there is a need for a more accurate method and means for dispensing additive concentrates in systems for delivering additives into feed rations at the feedlot, just before the time of intended consumption of the ration. One potentially more accurate approach is to dispense additive concentrates by weight rather than volume. It is believed that at least one weigh-type additive concentrate delivery system has been tried, but unsuccessfully. It is believed that such system weighed and then dispensed each additive separately and sequentially. It is believed that such system was unsuccessful because it was too slow and too inaccurate for handling additive concentrates in a feedlot environment.

U.S. Pat. Nos. 2,893,602 and 3,595,328 disclose machines for weighing batch amounts of aggregate mixtures such as asphalt. Each of these machines uses a scale or strain gauge to measure the amount of bulk material dispensed from a storage container. These systems are only suitable, however, for making the gross kinds of measurements needed in dispensing and mixing bulk materials such as aggregates for making asphalt or concrete, and feed grains for making feeds in commercial feed mills. The weighing components of these machines, for example, are not able to weigh gram amounts of materials as would be required for additive concentrate dispensing in feedlots. Even if they were able to make such fine measurements, their scales would be affected by environmental conditions commonly found at feedlots such as wind and movement of machine components that would adversely affect their accuracy to an unacceptable extent. Finally, these devices would lose accuracy progressively because of a buildup of residue of aggregate particles in their weighing containers during use. They would therefore be unsuitable for dispensing additive concentrates in a feedlot environment.

Accordingly, a primary object of the present invention is to provide a new and improved method and means for dispensing and delivering feed additive concentrates in various combinations and dosages to livestock using primarily weight-controlled rather than volumetric dispensing of additive concentrates.

Another primary object is to provide a new and improved method and apparatus for dispensing and delivering combinations of feed additive concentrates in a liquid slurry to a livestock feed ration at feedlots which is more accurate than prior such methods and apparatus.

Another object is to provide a method and apparatus as aforesaid which can be operated selectively either on a weight or volumetric basis.

Another object is to provide a method and apparatus as aforesaid that can be used effectively in a feedlot environment.

Still another object is to provide such an apparatus and method with an improved control system that can be controlled by a central processing unit that can be quickly and conveniently programmed to meet the varying needs of a given feedlot and different feedlots.

Finally, it is a specific object of the invention to provide a method and apparatus as aforesaid which can accurately dispense gram amounts of potent microingredient additive concentrates to accuracies within 0.5 grams.

SUMMARY OF THE INVENTION

The aforementioned objects are achieved by providing a method and apparatus for measuring, dispensing, and delivering different combinations and proportions of microingredient feed additive concentrates on primarily a weight basis, in small but accurate amounts, into a liquid carrier. The carrier and concentrates form a slurry which is delivered into a livestock or poultry feed ration shortly before the feed ration is delivered to the animals for consumption. The apparatus includes multiple dry and liquid additive concentrate storage means for storing the various additive concentrates separately at the feedlot. A plurality of separate dispensing means, such as conveyor screws for the dry additives and pumps for the liquid additives, dispense separately and without intermingling the additive concentrates from each of the storage means into a receiving means such as separate compartments of a hopper. Weighing means are provided for determining the weights of the different additives dispensed and for stopping the dispensing of each additive when a predetermined weight of that additive has been dispensed. The weigh means, for example, may comprise a weight scale means supporting the weigh hopper or supporting the storage means.

In a preferred embodiment shown and described, the weight hopper is scale-mounted, and the additives are dispensed and weighed sequentially and cumulatively as they are added to the weigh hopper. Isolating means isolate the weighing means from movements affecting its weighing function so that accurate weight determinations are obtained. A control means, such as a central processing unit, controls separately the operation of each dispensing means to dispense a given microingredient additive from a given storage means until a predetermined weight of that microingredient has been dispensed and weighed. When all selected additive concentrates have been dispensed into the weigh hopper and weighed, the hopper deposits its contents into a liquid carrier within another portion of the receiving means comprising a mixing vessel. The liquid carrier and additive concentrates are intermixed in the mixing vessel to dilute, dispense and suspend the additives in a liquid slurry. The slurry is then delivered to a receiving station where it is either sprayed directly into and mixed with a feed ration or held for subsequent addition to a feed ration.

The control means of the apparatus includes means for operating the apparatus either in a weigh mode, or, for example, if the weigh means is inoperative, in a volumetric dispensing mode.

The isolation means may include a separate, independently mounted and isolated weigh subframe assembly for the weighing components of the apparatus. Within the subframe assembly, scale components may be further isolated from other components. Further isolation may be provided by an independent main frame surrounding the subframe and protecting it from external forces by protective panels.

BRIEF DESCRIPTION OF THE DRAWINGS

The above and other objects and advantages of the present invention will become more apparent from the following detailed description which proceeds with reference to the accompanying drawings wherein:

FIG. 5 is an enlarged, perspective view of the weigh frame subassembly of the apparatus shown in FIG. 4.

FIG. 6 is an enlarged, fragmentary, perspective view of a load cell in a weigh tower of the weigh frame of FIG. 5, the remainder of the weigh frame being broken away.

DETAILED DESCRIPTION OF PREFERRED EMBODIMENTS

Introduction

The microingredient feed additive concentrates of the present invention include such potent substances as hormones, antibiotics, and vitamins that are typically administered to cattle and poultry at feeding operations, such as cattle feedlots, in gram amounts or less. It is often essential that a prescribed amount of a microingredient be delivered to an animal, and no more. Too little of a microingredient has no effect, while too much of it may be toxic or fatal. The range between too much or too little of some additives is often no more than 0.5 gram. The apparatus and method disclosed in this detailed description is intended to accurately dispense dry and liquid additive concentrates within this range of accuracy.

General Assembly

Figure 1:
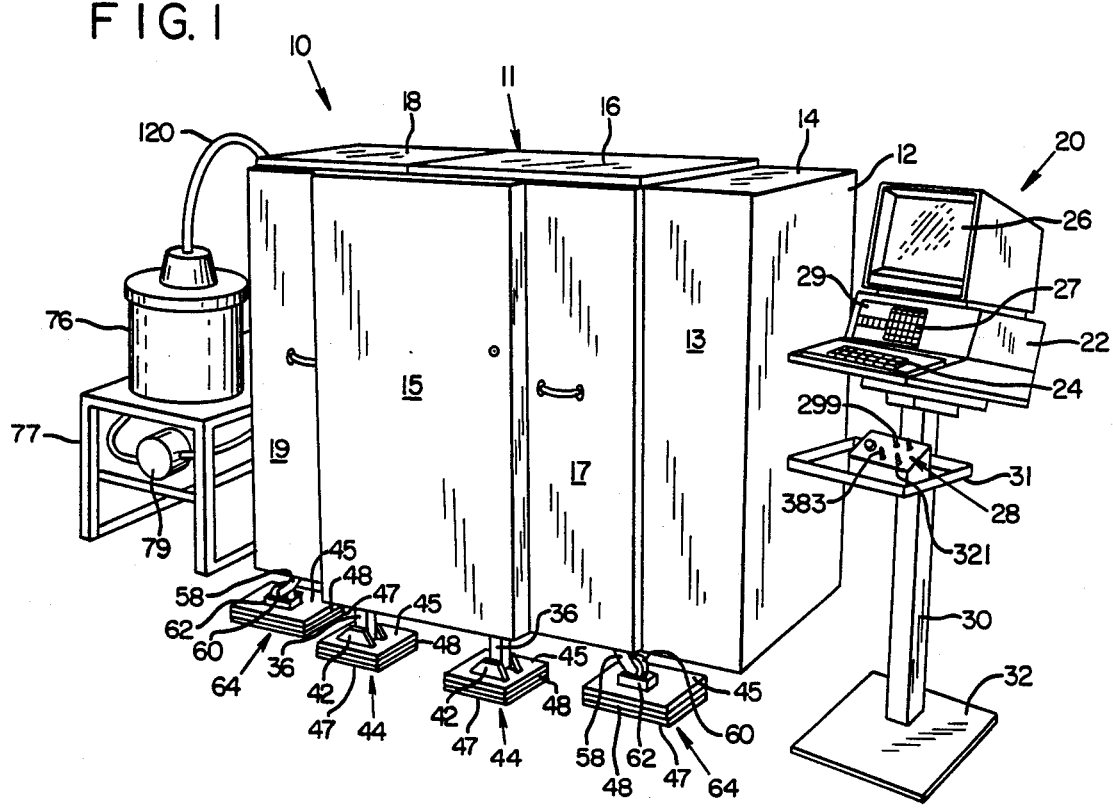
FIG. 1 is a perspective view showing the major components of an apparatus in accordance with the present invention.

With reference to the drawings, FIG. 1 illustrates an apparatus shown generally at 10 for measuring, dispensing, and delivering microingredient feed additive concentrates in small but accurate proportions in a liquid carrier slurry to livestock shortly before delivery of the feed ration to the animals for consumption. The apparatus 10 includes several separate components including a main cabinet 11, and a remote control unit 20, shown for convenience near cabinet 11 but normally located at a remote control station such as at a feed truck filling station in a feedlot. Additional separate components include multiple liquid additive concentrate storage containers 76, 78 (only one being shown in FIG. 1) supported on a stand 79, and their dispensing pumps 79 (see FIG. 2). Typically, a separate water supply tank 195 (FIG. 14) supplies the necessary carrier and flush water to the cabinet through fill and flush conduits (FIG. 10), via a booster pump 193 (FIG. 14).

Figure 14:
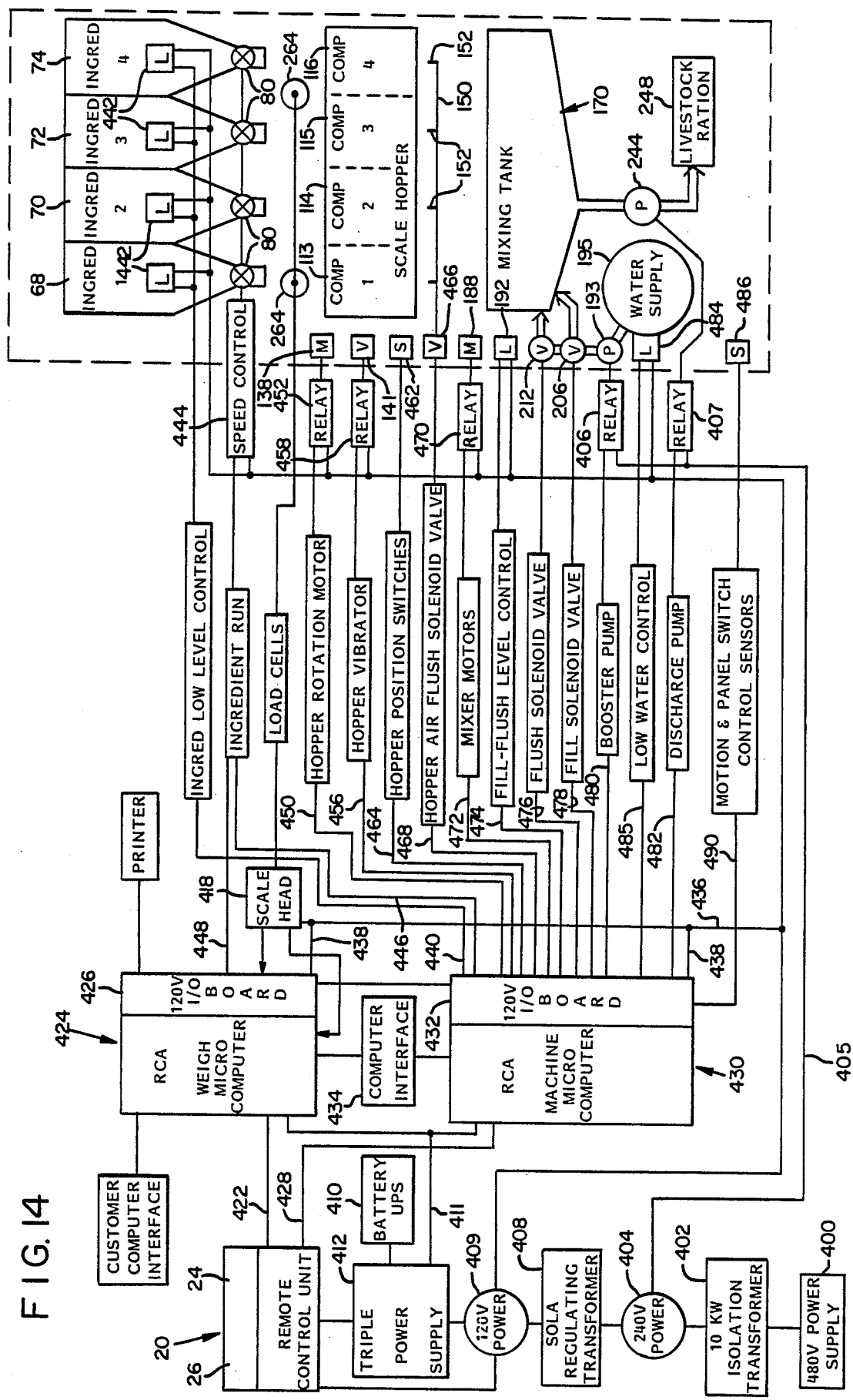
FIG. 14 is an electrical control schematic diagram for the illustrated apparatus.

Another separate cabinet (not shown) houses a weigh micro computer, or central processing unit, shown schematically at 424 in FIG. 14. A second microcomputer, or central processing unit, shown schematically at 430 in FIG. 14, for controlling the machine sequencing and volumetric metering functions, is housed within one end portion 13 of cabinet 11. Various speed controls and electrical relay interfaces and circuitry of the control system shown in FIG. 14 are also housed within cabinet end portion 13. Such end portion is a separate compartment of cabinet 11 that can be swung open about a hinged vertical axis for access.

Cabinet 11 houses the major mechanical components of the apparatus. The exterior of the cabinet, with its protective panels 12, completely encloses and shields such components from external dust, dirt and other contaminants common in a feedlot environment. The panels also protect the internal components, especially the weight-sensitive ones, from external forces such as wind, jarring contact, and the like, that would otherwise affect the accuracy of weight measurements.

Figure 4:
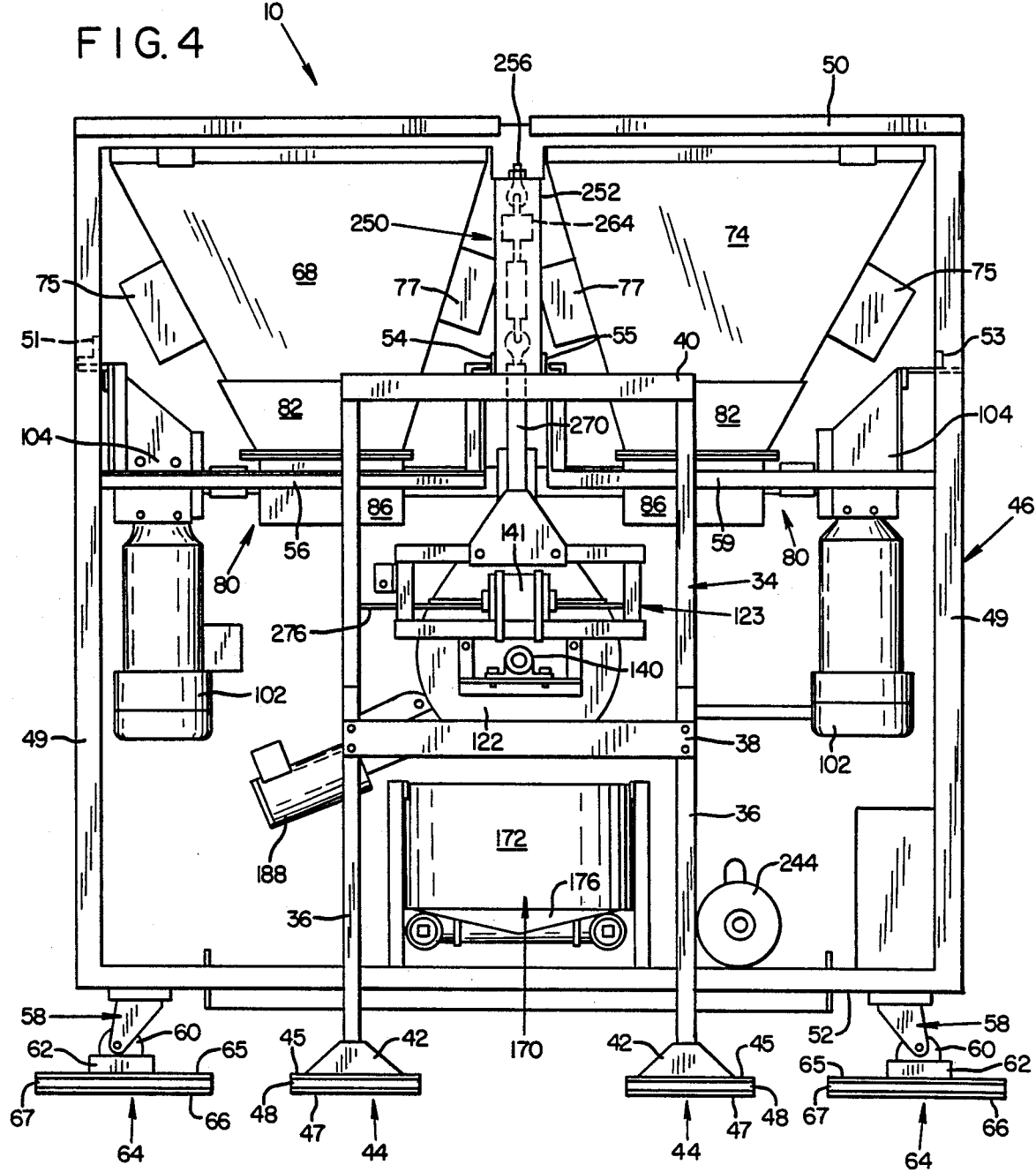
FIG. 4 is an enlarged, front elevational view of the main cabinet shown in FIG. 1, the cabinet panels having been removed to show the internal parts of the machine.

Referring to FIG. 4 showing the major components inside the cabinet 11, such components include a main frame 46 and an entirely separate and independently mounted subframe 34, each mounting certain components. Access to the components mounted on these frames is gained through access doors 15, 17, 19 in a front wall of the cabinet 11, and through hinged lids 16, 18 on a top wall of the cabinet.

In general, weigh subframe 34 mounts those components which are necessary to the weighing function of the apparatus, and main frame 46 mounts the remaining components that could, during their operation, induce undesirable movements in the weigh components to adversely affect the weighing function. Accordingly, the weigh subframe serves as a means for isolating the weigh components from internal machine movements induced through operation of components on the main frame.

The main frame components include storage bins 68, 70, 72, 74 for storing different dry additive concentrates, dry additive dispensing means 80 for dispensing additives from the storage bins, and an additive-receiving means comprising a mixing vessel or tank 170. Other main frame-mounted components include a discharge pump 244 for pumping slurry from mixing vessel 170, slurry mixers 180, and various plumbing components for supplying carrier and flush water to the mixing vessel and discharging slurry liquid from the vessel. Cabinet lids 16, 18 provide access to the storage bins for refilling them.

The subframe 34 includes an entire subassembly of weight components, including a weigh hopper means comprising the compartmented weigh hopper 122, and a suspension means for suspending the weigh hopper from a weighing means 250. The suspension means includes a pair of suspension frames 123, one at either end of the weigh hopper. Each such frame rotatably supports weigh hopper 122. Each suspension frame 123 includes a suspension arm 270 suspending the suspension frame from the weigh means 250. The weigh means includes, at each end of the subframe 34, a weigh tower 252 projecting upwardly from the subframe and suspending therein a load cell 264. The load cell in turn suspends the weigh hopper through an appropriate connection to suspension arm 270 of suspension frame 123.

Remote control unit 20 includes a computer terminal 22 supported on a stand 30 having a base plate 32. Terminal 22 includes a primary keyboard 24, a primary display screen 26, a small, secondary keyboard 27 and a small, secondary display screen 29. Various control switches and indicators are provided on a control switch box 28 mounted on a shelf 31 of the stand below the terminal 22.

Weigh Frame Subassembly

Apparatus 10 is seen therein and in FIG. 5 to comprise a weigh frame 34 having four uprights 36 and two each of parallel crossbeams 38, 40 and longitudinal beams 37, 39 rigidly interconnecting the four uprights 36. A vertical slat 41, 43 is carried between each pair of beams 37, 39. Each of uprights 36 has an enlarged foot 42 to enhance the stability of weigh frame 34. Each foot 42 is mounted on an elastomeric isolation pad 44 (FIG. 3) which absorbs vibrations or other environmental influences that may affect the accuracy of the functions performed by weigh frame 34. Each pad 44 includes a square upper plate 45 to which foot 42 is secured, the upper plate having a peripheral, downwardly depending flange which forms an enclosure. A square lower plate 47 is attached to a floor with bolts below plate 45 and has a peripheral, upwardly extending flange that forms an enclosure. A rubber cushion 48 is placed between plates 45, 47 within the enclosures formed by the flanges on the plates. Cushion 48 is thick enough to maintain the upwardly and downwardly extending flanges in spaced relationship so that vibrations are not communicated between plates 45, 57.

Main Frame Subassembly

Separate mounting or main frame 46 substantially surrounds weigh frame 34, the mounting frame 46 comprising four uprights 49 interconnected by four top support beams 50 and four bottom support beams 52. Two intermediate parallel support beams 51, 53 extend across opposing parallel faces of frame 46, and two parallel support beams 54, 55 extend across the middle of frame 46 parallel to beams 51, 53. A pair of parallel, U-shaped brackets 56, 57 are fixed to and suspend from beams 51, 54 (FIG. 8), and a pair of similar U-shaped brackets are fixed to and suspend from beams 53, 55. Only one U-shaped bracket 59 is shown in FIG. 4, although it will be understood that a second, parallel U-shaped bracket extends between beams 53, 55 in an arrangement similar to that shown in FIG. 8 for U-shaped brackets 56, 57.

Figure 3:
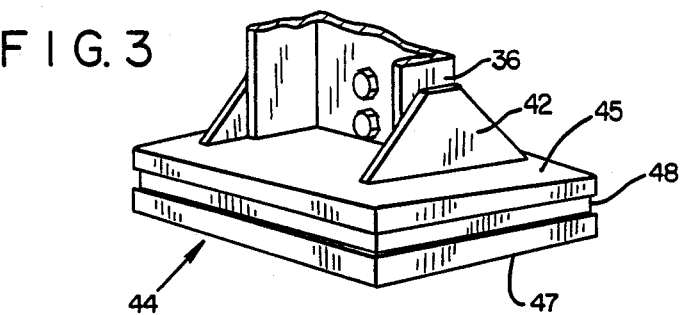
FIG. 3 is an enlarged, perspective view of a typical foot portion and isolation pad of a support leg of the apparatus of FIG. 1.

Mounting frame 46 is supported by casters 58 each having a roller 60 that is received within a cup 62 that is attached to an isolation pad 64 which is similar in structure to pad 44 shown in FIG. 3. Pad 64 comprises a top plate 65 having a peripheral, downwardly depending flange and a bottom plate 66 bolted to the floor and having a peripheral, upwardly extending flange. A rubber cushion 67 is positioned between plates 65, 66 within the enclosures formed by their peripheral flanges, the width of cushion 67 being great enough to keep the peripheral flanges in spaced relationship to one another and avoid metal to metal contact which might transfer vibrations.

Figure 2:
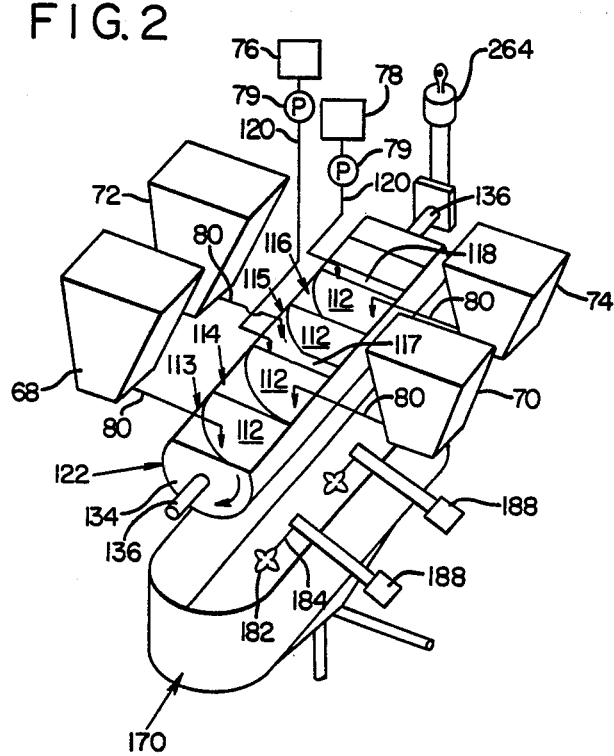
FIG. 2 is a schematic perspective view illustrating the internal components of the main cabinet shown in FIG. 1.

FIGS. 2 and 4 show multiple storage means such as dry additive concentrate storage bins 68, 70, 72, and 74 for storing separately a plurality of different dry microingredient feed additive concentrates. Each of the bins has a square top opening and square bottom opening, the bottom opening having a smaller area than the top opening such that the cross-sectional area of each bin diminishes in the direction of the bottom opening. A pair of vibrator motors 75, 77 (FIG. 4) are placed on each bin 68-72 to assist in moving dry microingredient concentrates out of the bins during dispensing.

A plurality of liquid containers 76, 78 are also shown in FIG. 2 for storing separately different liquid microingredient feed additive concentrates. The liquid containers are supported on a table 79 (FIG. 1) adjacent cabinet 11 and connected to the apparatus through flexible tubes described later.

A separate dry dispensing means 80 is provided for each dry bin 68-74. A separate liquid dispensing means 120 is provided for each liquid container 76-78. Each liquid and dry dispensing means is independently operated and controlled for dispensing separately several selected additive concentrates from their respective bins and liquid containers in predetermined weights during a machine operating cycle.

Figure 8:
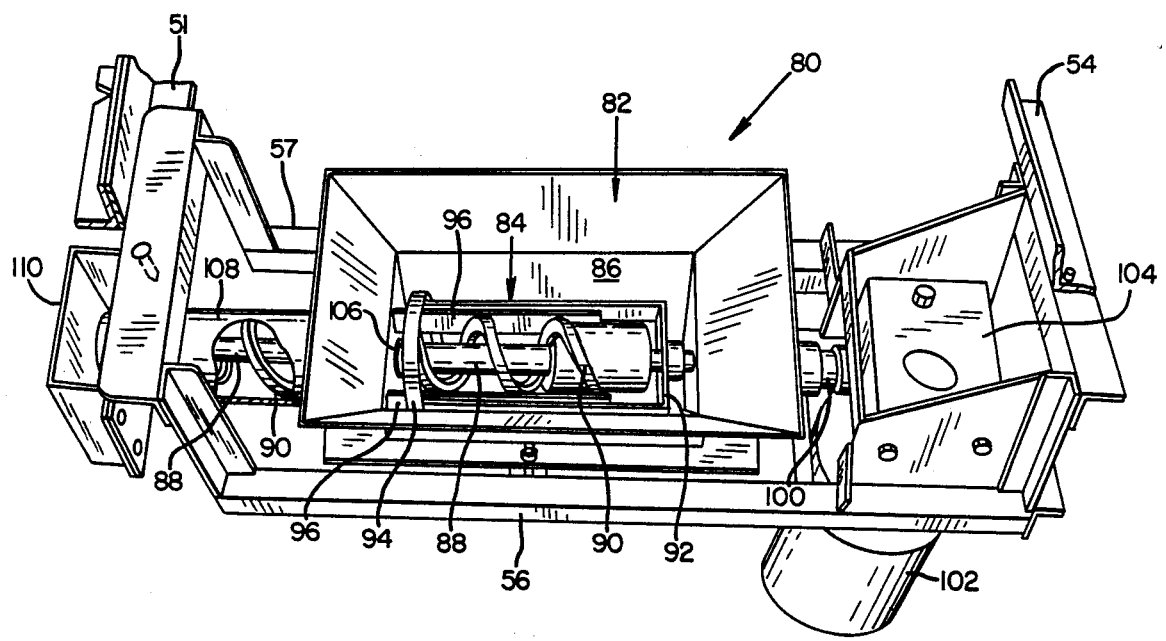
FIG. 8 is a fragmentary top perspective view of a dry additive dispensing means portion of the apparatus of FIG. 4, shown mounted on the main frame assembly of FIG. 4.

One of the dry dispensing means 80 for a dry microingredient is shown best in FIGS. 4 and 8. It includes an annular collar 82 having a square cross section. The collar fits closely about the open bottom of a bin 68-74 and extends partially up its sidewalls. Collar 82 has a square frusto-pyramidal configuration which defines a flow passageway of progressively decreasing cross section from the bottom bin opening to a top opening into a coreless metering screw assembly 84 within a rectangular lower extension section 86 of collar 82 having a curved bottom. Screw assembly 84 includes a rotatable core 88 which carries a helical metal screw 90 and rectangular screw agitator 92 with a circular band 94 around one end thereof. A stationary rear one-half tube extension 96 of a conveyor tube 108 projects into the interior of agitator 92 to start the conveyance of material that is moved by the screw 90 into conveyor tube 108. Agitator 92 helps maintain a uniform microingredient density around rotating screw 90.

Agitator 92 is rotated by a shaft 100 which is driven through a right-angle gear box 104 by a variable-speed motor 102, with three pre-set speeds. Core 88 and screw 90 project through opening 106 and into conveyor tube 108 having an open end that terminates adjacent a deflection plate 110 above the top opening of weigh hopper 122. Thus the metering screw assembly conveys additive from the supply bin into a compartment of the weigh hopper.

Each of liquid containers 76, 78 is provided with a separate dispensing means 120. Each liquid dispensing means is, for example, a variable-speed or displacement rotary or piston pump 79 (FIG. 2). The liquid dispensing means pumps liquid additive from a container 76, 78 through a flexible feed conduit which connects to a rigid dispensing tube end 120 (FIG. 5) on the weigh subframe to deliver the additive into a liquid compartment 117-118 of weigh hopper 122.

The hopper 122 (FIGS. 2, 4, 5, and 7) is carried by weigh subframe 34 between frame slats 41, 43 below the open end of extension tube 108 of screw conveyor 80. Hopper 122 is an elongated trough having a substantially semicylindrical cross section and a plurality of partitions 112 which divide the hopper transversely into several dry microingredient receiving compartments 113, 114, 115, 116. Each of the dry compartments 113-116 is provided with a deflector 132 on its partition wall having a triangular cross section that directs additive concentrates to the interior of the compartments during both filling and emptying of the hopper.

Additional partitions 111 of hopper 122 cooperate with some partitions 112 and upper walls 128 to define liquid additive-receiving compartments 117, 118 having narrow openings 130 into which liquid dispensing tubes 120 direct liquid additives from containers 76, 78.

The liquid and dry additive compartments of hopper 122 maintain dispensed additives separated until the hopper discharges its contents, after weighing, into the diluting liquid carrier within the mixing vessel 170 positioned vertically below the hopper.

Figure 7:
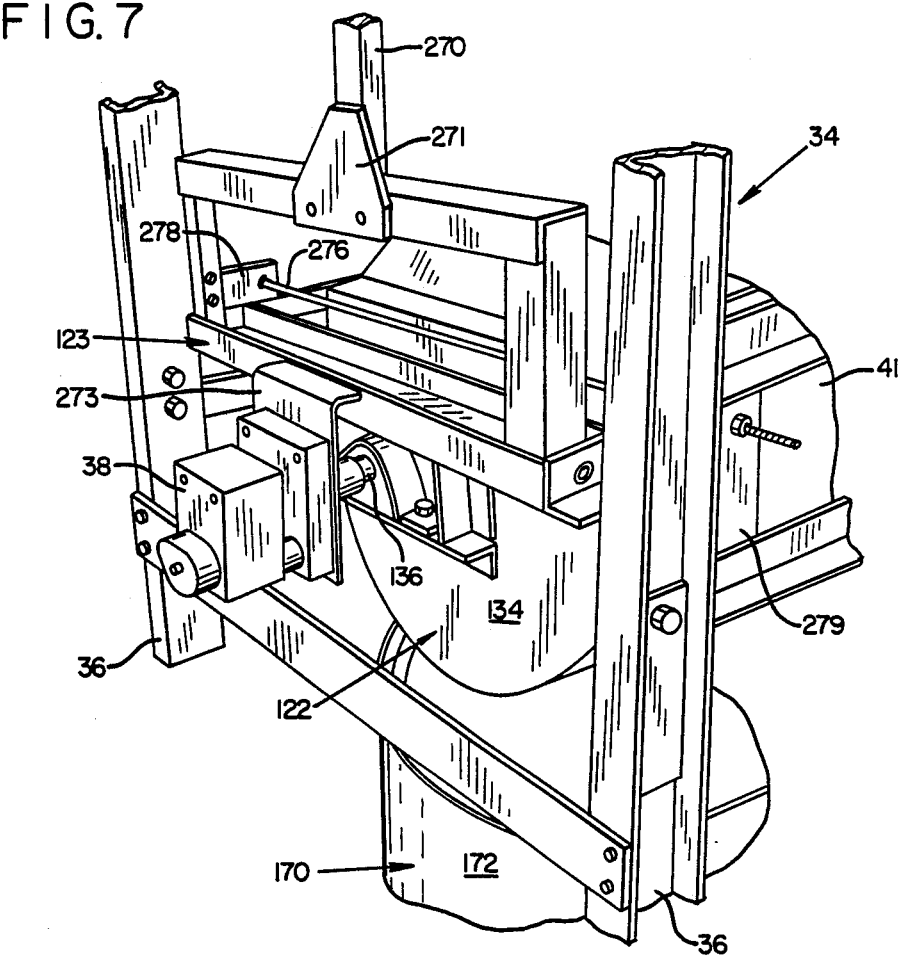
FIG. 7 is an enlarged, fragmentary perspective view of a portion of the weigh hopper subassembly of the weigh frame shown in FIG. 5.

Hopper 122 is supported by weigh frame 34 such that it is free to rotate about its longitudinal axis. Each semicircular end plate 134 (one being shown in FIG. 7) of hopper 122 is secured to a shaft 136. The shaft 136 at the hopper end shown in FIG. 7 is drivingly connected to a motor 138 that is fixed to hopper suspension frame 123 by a mounting bracket 273. The shaft at the opposite end of the hopper is mounted in a bearing 140 (FIG. 4). Motor 138 operates first to rotate hopper 122 to an inverted position for emptying (FIG. 11); then to an upright position (in the same direction) for the next dispensing and weighing cycle.

Figure 11:
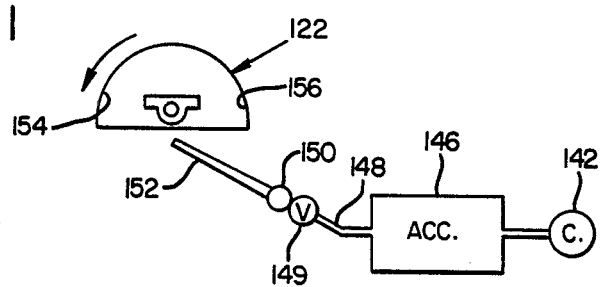
FIG. 11 is a schematic view of the air flush system for the weigh hopper portion of the apparatus.

An air flush means for compartments 113-116 of hopper 122 is shown in FIG. 11. The air flush means is carried by the main frame and comprises a compressor 142 in fluid communication through passageway 144 with air pressure accumulator tank 146. A solenoid valve 149 regulates the flow of air through passageway 148 to header 150. The header in turn fluidly communicates with a plurality of hoses 152 that project into each compartment 113-116 of hopper 122 when the hopper is inverted. Each of hoses 152 is positioned to direct a stream of air against far wall 154 of the hopper. It is not necessary to direct the air stream against near wall 156 because that wall will have already been scraped relatively clean by the movement of dry additives against the wall and out of the hopper as hopper 122 rotates to an inverted position.

A vibrator motor 141 is carried by suspension frame 123 at the end of hopper 122 opposite hopper rotating motor 138. Vibrator motor 141 operates during inversion of the hopper to promote emptying of the hopper compartments by vibrating the hopper.

An elongated mixing vessel 170 which serves as a receiving means for receiving additives from the hopper 122 and also as a mixing means for mixing such additives with water, is placed below hopper 122. Vessel 170 is an elongated tub that is longer and wider than hopper 122. Vessel 170 comprises a continuous, annular upright wall 172 around a sloping bottom formed from a plurality of triangular sections 176 that slope towards a pair of central bottom openings including an inlet port 177 and discharge port 178.

Variable speed flow inducing means, such as variable two-speed mixers 180, serve as part of the mixing means and are provided in mixing vessel 170 for inducing a turbulent flow of liquid within the mixing vessel. Each mixer 180 is comprised of four angled mixing blades 182 connected to the end of a rotary mixing shaft 184 that is connected to a gearbox 186 and motor 188 for rotating shaft 184. Each of motors 188 is mounted on a motor mounting frame 190 along an outside face of vessel wall 172. Level sensors 192, 194 are also mounted over the edges of wall 172 and project downwardly into the tub for determining the level of water contained therein and shutting off a supply of water to the tub when a predetermined level is reached. Sensors 192, 194 are, for example, electrodes through which an electrical circuit is completed or a timing circuit energized when the water surface in the tub reaches the predetermined level. Sensor 192 is the primary sensor, while sensor 194 is a backup sensor which detects a near overflow condition, closes fill solenoid 206, and interrupts the fill cycle.

Figure 10:
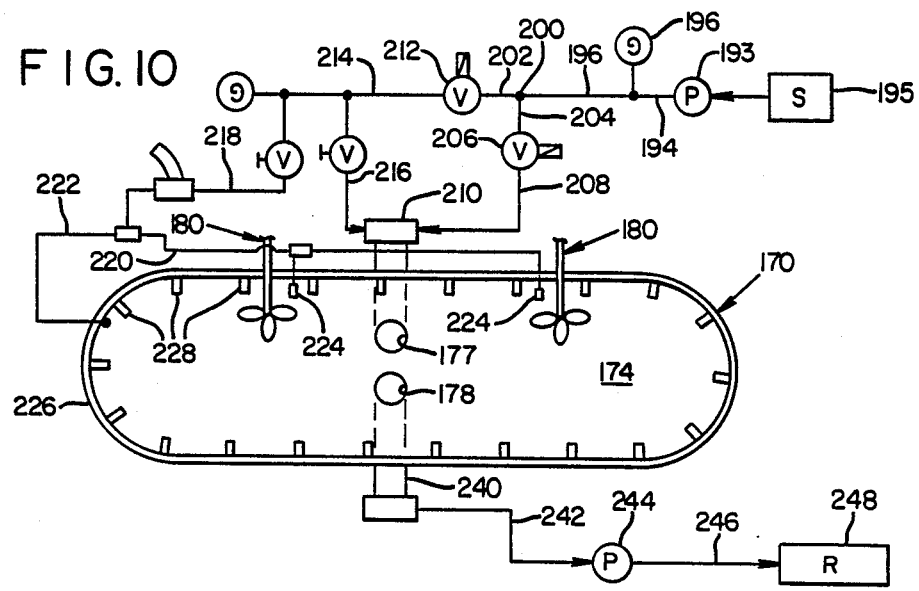
FIG. 10 is a plumbing diagram for the fluid components of the apparatus of the preceding figures.

FIG. 10 shows a plumbing system for apparatus 10 which delivers and removes carrier and flush water from vessel 170. Water is introduced from a source 195 by pump 193 through line 194 where its pressure is detected by pressure gauge 196. Water then continues to flow through line 198 where it is divided by tee 200 into water lines 202, 204. The flow of water through fill line 204 is controlled by solenoid valve 206 which, when open, allows water to flow through line 208, thence to conduit 210 and into vessel 170 through port 177. When solenoid valve 206 is open, a second solenoid valve 212 in line 202 remains closed such that all of the supply of water moves through line 204 to fill vessel 170.

Figure 9:
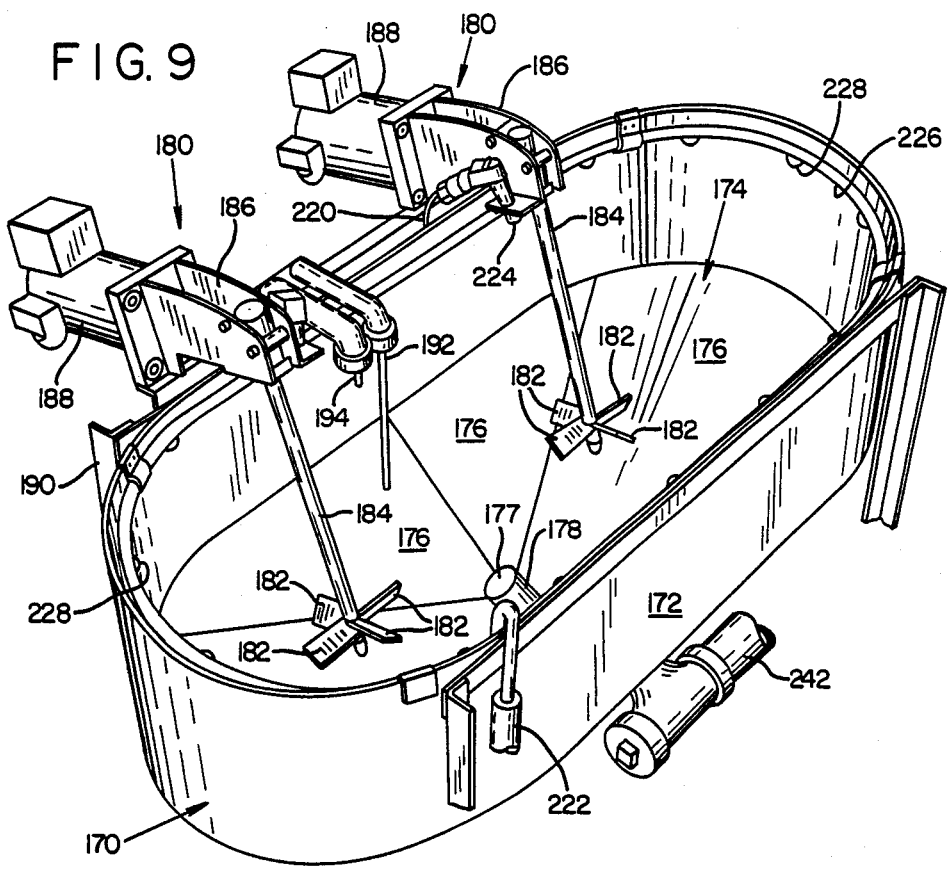
FIG. 9 is a fragmentary top perspective view of the mixing vessel and associated components of the main frame assembly shown in FIG. 4.

Solenoid valve 212 is interposed between line 202 and flush line 214 that in turn communicates with line 216 to establish fluid communication with conduit 210. Line 214 also fluidly communicates with line 218 having branches 220, 222. Branch 220 fluidly communicates with a pair of nozzles 224, one positioned above blades 182 of each mixer 180, nozzle 224 directing a flow of water onto the blades to clean them. Line 222 provides a passageway through which the water moves to flush ring 226 (FIGS. 9 and 10) which is positioned around the upper inner periphery of vessel 170 adjacent its top edge. Ring 226 has a number of flush nozzles 228 which direct a flow of water downwardly against wall 172 of vessel 170 to flush it.

Apparatus 10 also has a delivery means for delivering slurry from vessel 170 to a receiving station for mixing with an animal feed ration at a location remote from the mixing vessel. This delivery means includes discharge opening 178 in fluid communication with conduit 240 that empties into discharge line 242. Discharge pump 244 withdraws slurry through line 242 and sends it through line 246 to receiving station 248 where, typically, it is sprayed into a livestock feed ration and mixed therewith.

Weigh Means

A weighing means 250 (FIG. 6) is provided on weigh frame 34 for weighing predetermined weights of the different additive concentrates dispensed from bins 68-74 and containers 76, 78. Weighing means 250 includes a weigh tower 252 extending vertically upward from a crossbeam 40 of weigh frame 34 midway between uprights 36 at each end of frame 34. Each tower 252 has a flat top plate 254 with a central opening through which the threaded shank of an eye member 256 is placed and secured with a nut. A rubber pad 258 is placed against the interior face of plate 254 before member 256 is secured to top plate 254 with the nut. A pair of suspension members 260 pivotally interconnect eye member 256 and a second eye member 262 from which a load cell 264 is suspended. The amount of strain on load cell 264 is communicated to a control unit through line 265. The load cell 264 in the preferred embodiment is capable of weighing to an accuracy of 0.5 grams.

A rubber isolator pad 266 is pivotally suspended beneath load cell 264 by suspension members 268. A suspension arm 270 of the hopper suspension frame 123 is in turn suspended from isolation pad 266 by hook 272 and eye 274 secured to arm 270. Arms 270 of suspension frames 123 thus suspend hopper 122 such that the entire weight of the hopper is freely suspended from load cells 264. Arms 270 are braced by gussets 271 to their rectangular weigh frames 123. Hopper 122 is suspended interior to frames 123 between slats 41, 43 of frame 34 by suspending shafts 136, one of which is driven (FIG. 7) and the other of which is mounted in a bearing 140 (FIG. 4). The hopper is therefore free to rotate between frames 123 to an inverted position. This arrangement allows the weight of the hopper to be transferred through frames 123 to arms 270 for acting on load cells 264. The weight of additive concentrates in hopper means 122 can therefore be accurately determined.

As best shown in FIG. 7, a transverse vibration and sway dampening rod 276 extends between a bracket 278 carried by an upright of hopper suspension frame 123 and a bracket 279 carried by two longitudinal beams 37, 39 of weigh frame 34. Such a rod 276 is provided at each end of weigh frame 34 adjacent face 134 of hopper 122 for preventing or damping transverse movements of the hopper. A similar longitudinal rod (not shown) extends along one longitudinal side of hopper 122 to prevent or dampen longitudinal vibratory or swaying movements of hopper 122, one end of the longitudinal rod being fixed to longitudinal beam 39 and the other end being fixed to weigh frame 34. Such sway dampening rods provide part of the means isolating the weight-sensitive components of the apparatus from movements that could affect accurate weight measurements.

Control Means

Apparatus 10 is provided with a control means, such as a central processing unit, for controlling the operation of apparatus 10. In the preferred embodiment, two-programmed central processing units are used, one for operating the weighing functions of apparatus 10 and the other for operating all other machine functions.

Weighing Program

Figure 12:
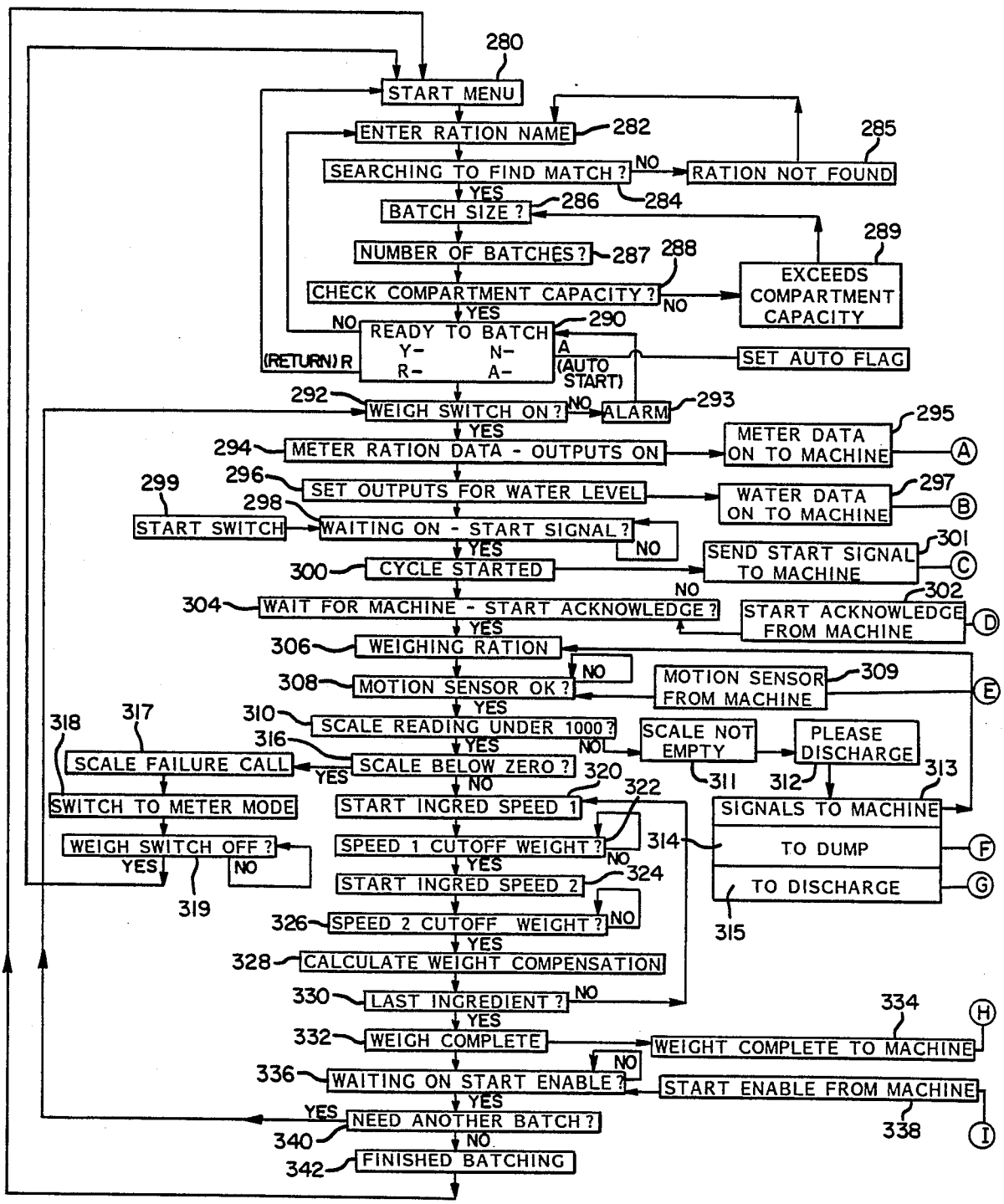
FIG. 12 is a flow diagram illustrating the logic of a computer program which controls the weigh means of the present apparatus.

The logic of the program for operating the weighing functions of the machine is shown in FIG. 12. The weighing CPU is activated by starting the menu at 280 and then entering ration data with keyboard 24 for a particular feedlot or data for one of a series of desired batches at a feedlot. The formulation of each desired batch has been preprogrammed into the computer such that a batch formulation can be chosen by entering a code number at 282. The computer then searches at 284 for a match to this encoded formulation until the match is found and the machine is ready to batch. If a match is not found, the program at 285 returns to step 280 and a prompt is sent to screen 26 to enter ration data.

Once a match is found at 284, a program prompt at 286 appears on screen 26 requesting the size of the batch to be prepared. After this information is entered, the program prompt at 287 requests the number of batches to be prepared, and if the batch size exceeds the capacity of the preprogrammed limit for the feed lot ration mixer or the compartments 113-118 of hopper 122, this is computed at 288. If capacity has been exceeded, a prompt is sent to screen 26 at box 289, and the program will request that new data concerning batch size and number be entered by returning to step 286. If capacity has not been exceeded, the machine is ready to batch at 290.

The weighing computer first checks to determine if a weigh switch is on at 292, and if the weigh switch is off, an alarm is sounded at step 293 and the program returns to ready at 290. The alarm will alert an operator that the weighing switch must be turned on in order for batching to continue.

Figure 13:
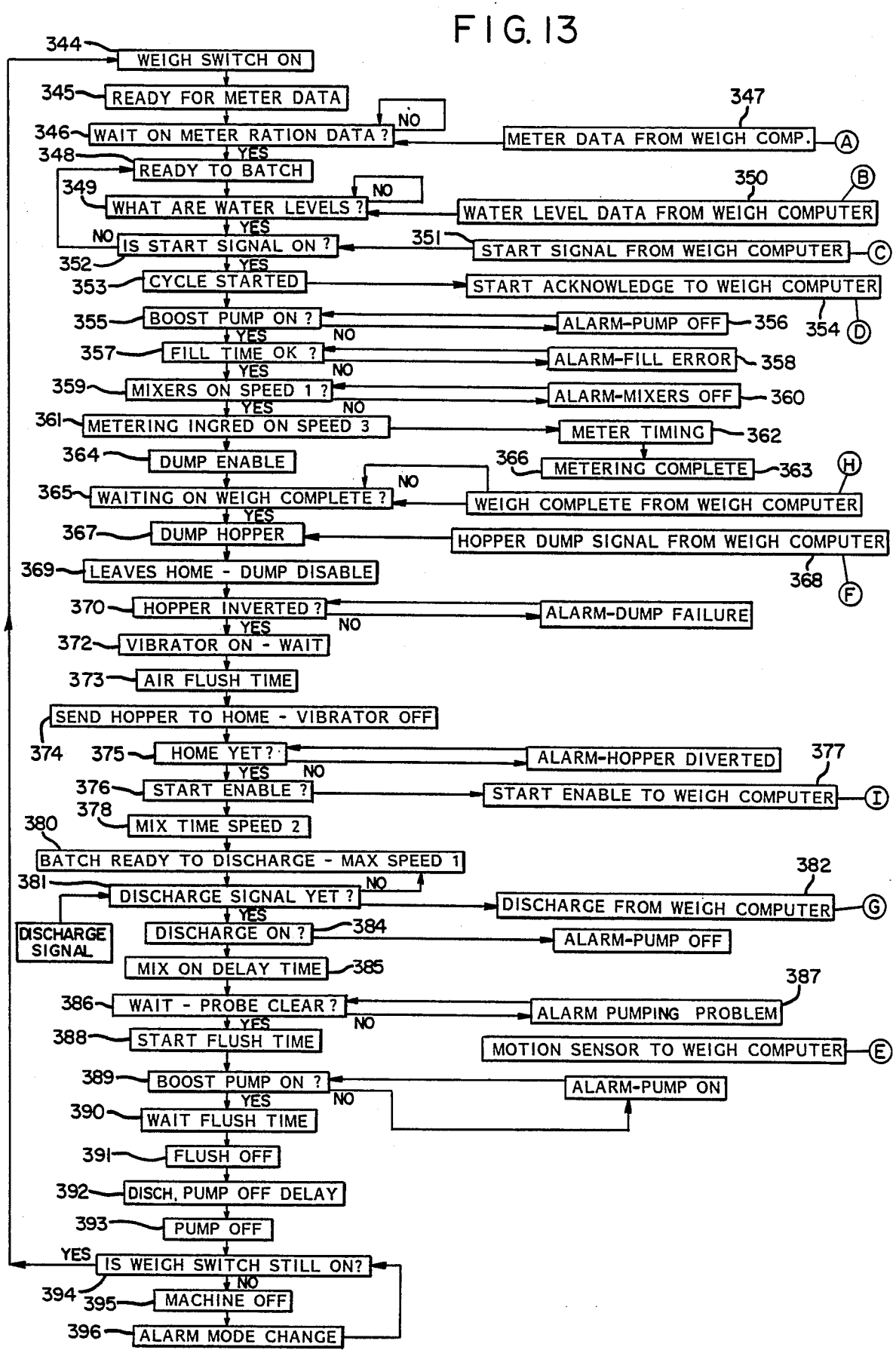
FIG. 13 is a flow diagram illustrating the logic of a computer program which controls all machine operating sequences and functions other than the weigh functions illustrated in FIG. 12.

The program next calculates metering ration data at 294 and sends it to the machine operating program at 295 as indicated by A in FIGS. 12 and 13. The metering data is calculated for any additives that have been selected for dispensing in the metering mode during the weigh cycle. Dispensing a portion of the additives by volume is more fully set forth in connection with steps 361-363 of FIG. 13 below.

The program then sets an output for the water level at 296, the level of the water determining how much fluid carrier will be present in the slurry which is ultimately delivered to receiving station 248. Water level information is sent to the machine operating program at 297, as indicated by B in FIGS. 12 and 13. The program next waits at 298 for a start signal which the operator gives by activating start switch 299 on switch panel 28. The weighing cycle is then started at 300 by sending a start signal at 301 to the machine operating program as indicated by C in FIGS. 12 and 13. Even though the weighing cycle has started, no weighing of microingredients acutally commences until a signal is received back from the machine operating program at 302 as indicated by D in FIGS. 12 and 13 that indicates weighing should begin at 304. This communication between the programs at D enables the machine operating program to begin its initial checks while microingredients are being dispensed and weighed.

Once the signal to begin weighing is received at 304, the weighing sequence begins at 306. It is first determined at 308 whether a motion sensor is detecting movement of hopper means 122. Information is received from the motion sensor on the hopper at 309, as indicated by E in FIGS. 12 and 13. The program will not progress beyond 308 until the motion sensor indicates that hopper means 122 is not moving, since movement of the hopper means will adversely affect weight determinations of load cell 264. Hopper means 122 can be put in motion by a variety of influences, such as wind gusts, floor vibration, personnel contact, or movement of machine parts. Although the effect of these movements on load cell 264 may not be great, the extreme accuracy required in dispensing microingredient feed additive concentrates makes absence of movement desirable.

It is next determined at 310 whether the scale reading is less than 1000 grams. If the reading is greater than 1000 grams, it is probably because the hopper means is not empty, as indicated at 311, and a signal is sent at 312, 313 to dump hopper means 122 so that weighing of a new lot of microingredients can begin. The signal to dump is sent to the machine operating program as indicated at step 314 and F in FIGS. 12 and 13. The mixers 182 are also started at 315 as indicated by G in FIGS. 12 and 13 so that the microingredients dumped from hopper means 122 will be mixed into a slurry and discharged to receiving station 248 in accordance with normal operation of the machine operating program described in connection with FIG. 13 below.

Figure 15:
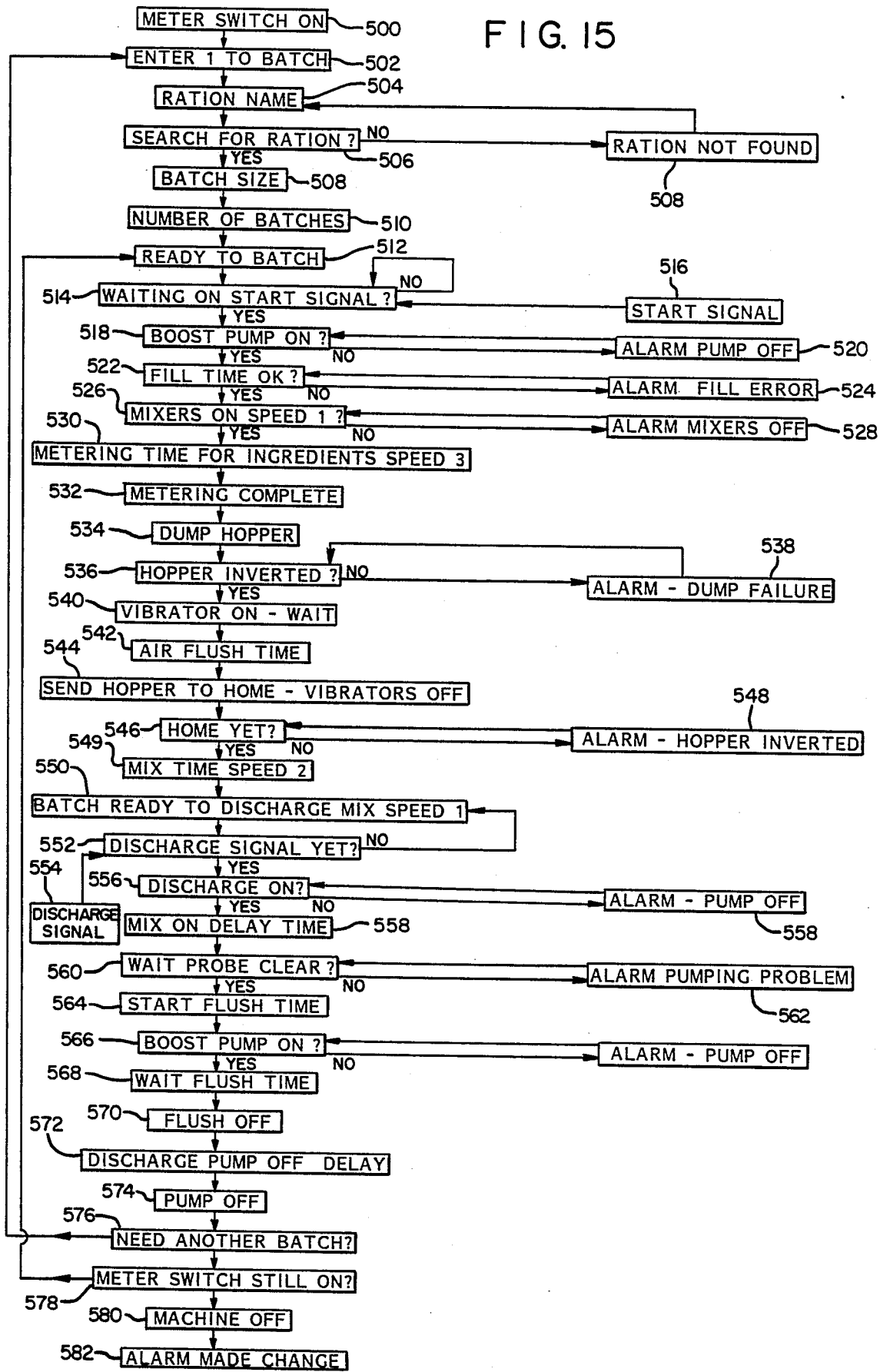
FIG. 15 is a flow diagram illustrating the logic of a computer program which controls alternative volumetric metering and dispensing functions of the illustrated apparatus.

If the scale reading is less than 1000 grams, it is determined at 316 if the scale reads below zero. If that is the case, a message is given to the operator by 317 on screen 26 that the scale has failed and the supervisor should be called. Then at 318 the program prompts the operator to switch to a backup metering mode system which dispenses additive concentrates by volume instead of by weight, and a prompt is sent at 319 to screen 26 directing that the weigh switch 321 at panel 28 be turned off. The operator then performs as outlined in FIG. 15 by turning the meter switch on at step 500 and entering ration data at 502. Volumetric metering of additive concentrates is performed by activating motor 102 of each bin 68-74 rotate screw 90 for a predetermined period of time. Since screw 90 will dispense an approximate known amount of concentrate per unit of time, a volumetric approximation of the desired amount of concentrate can be dispensed without weighing.

If the scale reads above zero at 316, the weighing mode of the program is instead used. Ingredient flow is started at 320 by activating motor 102 for screw 90 below bin 68. Motor 102 has at least two speeds so that it initially operates at a higher speed during the initial phase of dispensing additive concentrates from bin 68 into a first compartment 113 of hopper means 122. The weight of concentrate introduced into compartment 113 is sensed by load cell 264 and that information is continually fed back to the computer through line 265. As the weight of concentrate dispensed from bin 68 approaches the predetermined amount of that concentrate for the batch formulation chosen at 282, motor 122 is switched to a lower speed at 322 and 324 that more slowly dispenses the concentrate from bin 68 during a final phase of dispensing. In this manner, a more accurate weight of microingredient can be dispensed from bin 68 into compartment 113 since the dispensing of additive will have slowed before it is finally stopped when the correct weight of this first concentrate is sensed at 326.

The program contains a weight compensation step at 328. It sometimes happens that the actual weight of additive concentrate dispensed by dispensing means 80 into compartment 113 will be slightly greater or less than the desired weight set by the ration data at 282.

The program compensates for such inaccuracies by adding or subtracting a weight compensation factor to the ration amount set for the additive concentrate at 282. In this manner, the weight inaccuracy will be corrected the next time a microingredient additive is dispensed from bin 68 into compartment 113.

When the predetermined weight of microingredient additive concentrate is sensed at 326 and the weighing of that component has been completed, the computer determines if the just dispensed concentrate was the microingredient dispensed at 330. Assuming the microingredient concentrate in bin 68 was not the only concentrate to be dispensed in this formulation, the program then returns to box 320, and the flow of ingredients from bin 70 is initiated by activating motor 102 beneath bin 70 to turn screw 90 at a fast speed and begin moving microingredient additive from bin 70 into compartment 114 of hopper means 122. Load cell 264 continues to sense the weight of concentrate added to hopper means 122 from bin 70 until that weight begins to approach the final predetermined weight desired of the second concentrate. This predetermined weight will be the total actual net weights of the first additive concentrate plus the predetermined weight of the second additive concentrate since hopper means 122 has not yet inverted and the first additive concentrate still remains in compartment 113. As the total combined actual weight of additive concentrate in compartments 113, 114 approaches the predetermined amount, motor 102 is switched to a slower speed, and additive concentrate is continued to be slowly dispensed with screw 90 from bin 70 until the total combined weight of additive concentrate is reached, and motor 120 is shut off.

This same procedure is repeated until the predetermined weight of additive from each of bins 72, 74 is similarly dispensed into compartments 115, 116. Liquid microingredient additive concentrates from containers 76 and 78 are dispensed by activation of a liquid pump which sequentially dispenses liquid additive from containers 76, 78 into liquid receiving compartments 117, 118 of hopper means 122 until a predetermined amount of each liquid additive has been dispensed.

Once the last additive has been dispensed, as determined at 330, the computer determines that weighing has been completed at 332, which sends at 334 a signal to the machine sequence program as indicated by H in FIGS. 12 and 13. The computer pauses at 336 to wait on discharge of hopper means 122. Once dumping of hopper means 122 has been completed by inversion of the hopper and its return to an upright position, this information is sent from the machine operating program of FIG. 13 to the weighing program of FIG. 12 as shown at I and 338. It is then determined at 340 whether another batch of microingredient is required. If not, the program returns from 342 to its starting point at 280. If another batch is required, the program returns to box 292 and the sequence repeats itself as described above.

Although not shown in FIG. 12, the weigh program can be modified to keep a running inventory of additive concentrates. This can be accomplished by entering into the weigh computer the weight of additive concentrate placed in each of bins 68–74 and containers 76, 78. The weight of each concentrate actually dispensed and sensed by load cells 264 is then subtracted from the original weight of concentrate to determine the inventory of concentrate remaining.

The control means can also be programmed to perform other functions that enhance the accuracy of weight determinations by the weighing means. For example, the isolating means can include programming the control means to prevent acceptance of the measured weight by the control means following operation of dispensing means 80 until motion of hopper means 122 sensed by motion sensors has subsided to a level that will not affect load cells 264. The same result can be achieved by programming the control means to delay operation of all other movable machine components (such as dispensing means 80, 120 or mixers 182) for a predetermined period of time sufficient for hopper 122 to settle or until any oscillatory movements to subside. Alternately, the isolating means can include programming the control means to prevent operation of moving components (such as dispensing means 80, 120 or mixers 182) while weight determinations are being made by the load cells 264.

Machine Sequence Program

FIG. 13 schematically illustrates the logic of a program for actuating the sequence of operations of apparatus 10. The program begins by determining at 344 if the weigh switch on switch panel 28 has been turned on. Once the weigh switch is on, the program is ready for a metering data signal at 345. It waits at 346 until the metering ration data is received at 346 from steps 347 and 295 as indicated by A.

Once the metering data is received, the program is ready to batch at 348. It receives water level data at 349 from 350 and 297 as indicated by B. The start signal from 301 is then relayed via C to 351 and 352. The machine cycle is then started at 353, and initiation of the cycle is signaled to the weighing program from 354 through D to 302.

Boost pump 193 is then turned on at 355 for introducing water through line 194 in FIG. 10 with solenoid 206 open and solenoid 212 closed. It is determined at step 355 if the boost pump is on, and if it is not, an alarm is sounded at 356 that the pump is switched off. Boost pump 193 introduces water through line 208, conduit 210, and port 177 until a predetermined water level set at 294 is sensed by level probe 192. If the predetermined water level is not reached within a set period of time as indicated by 357, an alarm sounds at 358 to indicate that an error has occurred. Otherwise, if mixing vessel 170 fills within the set time, this condition is detected by level probe 192 and mixing blade motors 188 are activated at 359 on a slow speed to cause the water in mixing vessel 170 to flow. If the motors 188 do not turn on, an alarm is given at 360 to alert the operator of this malfunction.

It is possible to accurately dispense some liquid microingredient additives such as those in containers 74, 76 by volumetric metering instead of weighing. Such accurate volumetric metering is possible since the density of most liquids is quite constant over the range of environmental conditions in which apparatus 10 is used. Volumetric metering of liquid additives selected by the metering ration data is achieved at 361 by activating the piston pump in dispensing means 120 for a period of time determined by 362, 363. Once the metering stop is completed, the dumping mechanism is enabled at 364 for proceeding to weigh complete step 365 before inverting hopper 122.

The program waits at step 365 for the weighing sequence shown in FIG. 12 step 320 through step 334 to be complete. Once the weighing sequence is completed at step 334, a signal is sent to 365 through 366 at H from the weigh program, and the sequence program progresses to 367 where a signal is given at 368 from 314 via F to actuate motor 138 and invert hopper means 122 to dispense the additive concentrates contained in compartments 113-118 separately but simultaneously into the flowing water of vessel 170. The dumping mechanism is disabled at 369 once the hopper leaves its upright position. Once hopper means 122 is inverted at 370, vibrators on the hopper are activated at step 372 to promote complete removal of all microingredient particles from bins 113-118. Compressor 142 is next actuated at 373 to compress air in air tank 146, and a solenoid to header 150 is opened which moves a flow of air through hoses 152 and toward wall 154 of each of compartments 113-116 to remove any traces of solid additive concentrates from the compartments. Air flushing continues for a predetermined period of time at step 373.

Hopper means 122 is then sent to its home position at step 374 by activating hopper motor 138 to continue to turn shaft 136 in the same direction it turned to invert the hopper. When the hopper returns to its upright position, this is sensed by a switch as indicated by step 375, and a signal is sent at 376, 377 to 338 through I that the contents of hopper means 122 have been dumped, and another weigh cycle (FIG. 12) can begin. Meanwhile the machine operating program of FIG. 13 progresses to step 378 which switches motors 188 of mixers 180 to a higher speed. The lower motor speed is used until hopper means 122 leaves its inverted position since high speed mixing while the hopper is inverted could cause water drops to be splashed into containers 113-116. Step 378 also begins to measure a predetermined mixing time. When the period for the preselected mixing time expires, as determined at 380, the mixing motors 188 are switched back to their lower speed. Once the weighing program receives a discharge signal at 381 from step 315 through G and 382, or alternately from actuation of a discharge switch 383 on switch panel 28, a discharge signal is sent by the program at 384 to discharge the slurry in vessel 170. A solenoid valve in line 240 then opens, and pump 244 (FIG. 10) is activated to remove the slurry through outlet 178 in vessel 170. Mixers 182 continue turning at a slow speed until a predetermined period of time expires, as set by step 385. Pump 244 continues operating as the water level lowers and finally clears the bottom of probe 192, as illustrated by step 386. If the level probe is not cleared within a predetermined period of time, an alarm is given at 387 to indicate a pumping malfunction.

After the water level clears the bottom of probe 192, pump 244 continues operating and a timed flush cycle begins at 388. Boost pump 193 is activated at 389 for introducing water through line 194 as solenoid 206 is closed and solenoid 212 is opened. In this manner, flush water is introduced through line 214 so that it enters vessel 170 through nozzles 228 of flush ring 226, blade flush nozzles 224, and port 177. The interior of vessel 170 and the surfaces of blades 182 are thereby flushed, completely removing any residue of microingredient additives from the vessel through inlet 179. The boost pump continues introducing a water flush into vessel 170 until the flush time period expires at 390, and the flush is determined at 391. Discharge pump 244 continues pumping for a delay period following the end of the flush cycle, as shown at 392; then discharge pump 244 is turned off at 393.

The program then determines if the weigh switch is still on at 394 and if it is, the program returns to step 344 to repeat the sequence described in steps 344-393. If the weigh switch has been turned off, the apparatus 10 is turned off at 395 and an alarm is given at 396 to indicate that a mode change has been made.

The control means includes means for operating mixers 180 and discharge pump 244 at the same time as dispensing means 80 such that a first batch of additive concentration slurry can be mixed and delivered to a receiving station while a second batch of additive concentrates are dispensed and weighed prior to their deposit into the mixing vessel.

Electrical Schematic

A schematic diagram of the electrical connections for apparatus 10 is shown in FIG. 14.

It is important to the proper operation of a computer that it be supplied with electrical power of a constant and consistent quality. This is a serious drawback in rural areas where the electrical power being supplied is often at the end of a long supply line into which fluctuations are introduced by intervening power users. Most cattle yards and other users of apparatus 10 are located in rural areas where variations in power would adversely affect operation of the computers which control weighing and sequencing of machine function. For that reason, the present invention employs a series of transformers to selectively filter the electrical energy, isolate the power source, and damp variations in the power before it is supplied to the computers.

Four hundred eighty volts of power are supplied at 400 by a rural electrical utility, and that power first passes through 10 kw isolation transformer 402 where it is transformed into 240 V power, illustrated by 404 in FIG. 14. This initially filtered 240 V power is supplied to electrical connection line 405 through relay 406 to booster pump 193 that introduces water into mixing tank 170 during the filling and flushing cycles. The 240 V power is also supplied through relay 407 to pump 244 that helps drain the mixing tank. This relatively unfiltered power can be supplied to pumps 193, 244 since they are not as sensitive to power variations as the computers.

The 240 V power is also sent to a sola-regulating transformer 408 where it is transformed to 120 V power, as illustrated at 409. This filtered, 120 V power is used to provide electrical energy to all components of apparatus 10 other than pumps 195, 244. If electrical energy is interrupted, three 12 V batteries 410 connected in series are provided as an uninterruptable power supply through triple power supply 412.

Remote control unit 20 has monitor screens 26, 29 and keyboards 24, 27 for weighing and metering functions. Remote control unit 20 is electrically connected through line 422 with a weigh microcomputer 424 (RCA 1800 Micro System Z80 Microprocessor) having a 120 V optically isolated input/output relay board 426. Remote control unit 20 is also connected through line 428 with machine sequencing microcomputer 430 (RCA 1800 Micro System Z80 Microprocessor) having an optically isolated input/output relay board 432 (Opto PB 24Q). Computer interface 434 provides a data bus between weigh microcomputer 24 and machine sequencing computer 430.

Machine sequencing computer 430 and weigh computer 434 are supplied with 5 V power from triple power supply 412 through line 411. Both I/O boards 426, 432 are supplied with 120 v power through line 436 at 438.

Weigh computer 242 contains an eight slot card cage with three 662 RAM memory cards that contain the programs for operation of the weighing functions and monitoring of microingredient additive inventory. Weigh computer 424 also contains a service box 641 card to connect the service box to the computer, a printer 641 output card, a 600 system operating program card, and a 6264 memory card.

The machine computer 430 has a six slot card cage, including two 662 RAM memory cards, as well as a 659, 650, 641 and 600 CPU card. When apparatus 10 is functioning in the metering mode, it uses only machine computer 430. A complete set of ration data is stored on the machine computer's ROM memory separate from the ration data stored on the RAM memory cards of weigh computer 424.

I/O board 426 is connected through line 448 with a speed control 444 for controlling the speed of dispensing means 80 in the weigh mode during a weight cycle. For additives dispensed in weigh mode, speed control 444 determines whether screw 90 rotates at a fast speed during the initial weighing period of a given concentrate, or at a slow speed during the terminal phase of weighing as the weight of the concentrate approaches its predetermined amount. Since it is necessary to sense the weight of each concentrate that has been dispensed before the speed of dispensing means 80 can be reduced and then stopped, load cells 264 are electronically connected through scale head 418 to the weigh microcomputer 424. Weight determinations of the weighing means can therefore be sensed and sent to speed control 444. For additives dispensed by volume during a weigh cycle, speed control 444 determines that screw 90 rotates at the preset third speed during the predetermined time of volumetric dispensing controlled by micro computer 430.

I/O board 432 is connected through line 446 with speed control 444 for controlling the speed of dispensing means 80. Speed control 444 determines that screw 90 rotates at the preset metering speed on the third speed of speed control 444 for a predetermined amount of time of volumetric dispensing controlled by microcomputer 430.

Input/output board 432 is connected through line 440 with ingredient level controls 442 in each of bins 68–74 and containers 76, 78. These level controls are conventional switches located within the bins and containers for sensing when the level of additive concentrate in each bin has reached a predetermined low level. When the low level of additive concentrate is sensed by low level control 42, a signal is sent to the operator indicating that more concentrate should be added.

I/O board 432 of machine sequencing microcomputer 430 is connected through line 450 and relay 452 with hopper rotation motor 138 that inverts hopper means 122. Line 456 connects I/O board 432 through relay 458 with vibrator 141 on hopper means 122. A switch 462 is also provided on hopper means 122 for sensing whether the hopper is in an upright or inverted position, switch 462 being connected to I/O board 432 through line 464. Finally, hopper means 122 is provided with hopper air flush solenoid valve 466 in header 150 for controlling the introduction of air flush into compartments 113-115 of the hopper after it reaches its inverted position. Solenoid valve 466 is connected to I/O board 432 through line 468.

Mixer motors 188 on mixing vessel 170 are connected through relay 470 and line 472 with I/O board 432. Level control 192 of the mixing vessel is connected with I/O board 432 through line 474. Solenoid valve 212 in flush line 202 is connected to I/O board 432 through line 476, and solenoid 206 in fill line 204 is connected to I/O board 432 through line 478. Booster pump 195 for pumping water into vessel 170 is connected through relay 406 and line 480 with I/O board 432, while pump 244 for withdrawing slurry and flush water from vessel 170 is connected through relay 407 and line 482 with I/O board 432. Low water control 484 for the water supply is connected through line 485 with the I/O board. Motion and panel control sensors 486, which detect any oscillatory movements of hopper means 122 and determine if any of the panels 12 have been removed from apparatus 10, are interconnected with I/O board 432 through line 490.

Metering Mode Program

As earlier described in connection with FIG. 12, in the event of scale failure at step 317, apparatus 10 switches to a meter mode at 318 and the weigh switch is turned off at 319. The off position of the weigh switch at 319 is sensed at the meter switch being on at step 500 in FIG. 15. The numeral 1 is entered at keyboard 24 at step 502 to begin batching in the metering mode, and a ration code name is entered at 504. The metering mode program of FIG. 15 searches at 506 for a ration corresponding to the code entered at 504. If the corresponding ration is not found at 506, the program returns at 508 to step 504 so that another ration name can be entered.

Once the entered code has been matched with a ration at 506, the program prompts for entry of information concerning batch size, which is entered at 509. The program next prompts for entry of information concerning the number of batches to be processed, which is entered at 510. The machine is then ready to batch at 512 by volumetric metering instead of by weighing.

The program waits at step 514 for a start signal 516, which is supplied by a start switch 299 on control panel 28. It is then determined at 518 if boost pump 193 is on and if it is not, an alarm is given at 520 to indicate that the pump if off. Boost pump 193 fills mixing vessel 170 during a predetermined amount of time at step 522. If the water level in mixing vessel 170, as detected by water level sensor 192, does not reach a predetermined level within a set period of time, an alarm sounds at 524 to indicate a filling error.

Once level sensor 192 determines that the water level in mixing vessel 170 has reached a predetermined level, mixing motors 188 are activated at 526 to rotate mixing blades 182 at a slow speed. An alarm sounds at step 528 if the mixers are not on. While mixer blades 182 induce a turbulent flow of water in mixing vessel 170, motor 102 for screw 90 below bin 68 is activated at 530. The metering speed of motor 102 is a third speed, intermediate the fast and slow speeds used in dispensing additive concentrates by weight. Screw 90 turns for a predetermined period of time sufficient to dispense a required volume of additive concentrate. The screw of each dispensing means 80 below the bins containing desired additive concentrates turn simultaneously. Dispensing means 120 for liquid additive concentrates in containers 76, 78 also operate simultaneously with dispensing means 80 to volumetrically deliver predetermined amounts of liquid concentrate to compartments 117, 118.

When metering is complete at 532, a signal is sent to motor 138 at step 354 to invert hopper means 122 and dump its contents into the flowing water of vessel 170. A switch determines at 536 whether the hopper is inverted, and if it is not, an alarm is given at 538 to indicate a dump failure. Hopper vibrators are then actuated at 540 while hopper means 122 is inverted to remove, by vibration, additive concentrate particles that remain stuck to the walls or bottom of containers 113–116. The air flush (FIG. 11) is actuated at 542, and the program sends a signal at 544 to send the hopper to its home, upright position by actuating motor 138 to continue rotation of shaft 136. If hopper means 122 does not reach its home, upright position within a predetermined period of time set by 546, an alarm sounds at 548 to indicate that a malfunction has occurred and the hopper is still inverted.

When hopper means 122 leaves its inverted position, mixing motors 188 are switched to their second, higher speed at 548. High speed mixing continues for a predetermined amount of time and then returns to low speed at step 550 until a discharge signal 554 is received at 552 from a discharge switch 383 on panel 28 to turn on discharge pump 244. It is determined at 556 whether discharge pump 244 is on, and if it is not, an alarm is given at 558 to indicate a pump malfunction.

A predetermined, mix delay time period is initiated at 558 during which period motors 188 continue to move mixing blades 182 at low speed. If the bottom of level probe 192 is not cleared at 560 within the predetermined period of time set in step 558, an alarm is given at 562 to indicate pumping problems. Once probe 192 has been cleared, a predetermined flush cycle time is initiated at 564, and boost pump 193 is actuated at 566 to move water through flush line 214 while solenoid 212 is open and solenoid 206 is closed. Boost pump 193 continues introducing water through line 214 and into flush ring 226, blade cleaning nozzles 224, and port 177 until a flush period has expired at 568 and pump 193 is turned off at 570. Discharge pump 244 continues operating for a period of time set by 572 until all of the flush water residue has been removed through drain 178 and sent to receiving station 248. Discharge pump 244 is then turned off at 574 when the delay period set at step 572 expires.

The metering mode program then determines whether another batch is needed at 576, the need for another batch having been determined by the number of batches entered at 510. If another batch is not needed, the program returns to step 502 which prompts the operator to enter the code for another batch. If, on the other hand, another batch is required at 576, the program checks at 578 to determine if the meter switch is still on. If the metering swtch is on (and conversely the weigh switch is off), the program returns to step 512 where it repeats steps 512–576. If it is determined at 578 that the meter switch is off, apparatus 10 is turned off at 580 and an alarm is given at 582 indicating a mode change.

Other Embodiments

Figure 16:
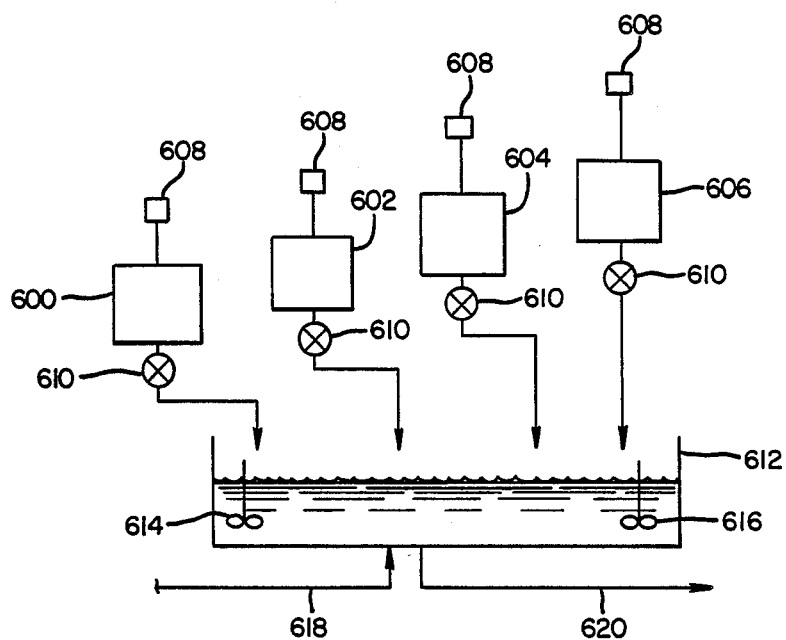
FIG. 16 is a schematic view illustrating a first alternative embodiment of the invention in which microingredient additive concentrates are dispensed directly into a mixing vessel from individually weighed storage containers.

FIG. 16 shows a second embodiment of apparatus 10 in which hopper means 122 has been eliminated. In this embodiment, the weight of each microingredient concentrate dispensed is determined on a "loss of weight" basis. Each of dry concentrate bins 600, 602, 604, 606 is provided with a load cell 608 for determining the weight of each container. The program in this embodiment activates a dispensing means 610 (similar to dispensing means 80 in apparatus 10) to selectively sequentially or simultaneously deliver dry microingredients separately from bins 600–606 into mixing vessel 612 having mixers 614, 616. Tank 612 is filled and flushed through water supply line 618 and emptied through discharge line 620 after concentrates have been mixed with water in mixing vessel 612.

Liquid microingredient concentrates may also be dispensed on a "loss of weight" basis by mounting containers of liquid microingredient on load cells.

The control means for the FIG. 16 embodiment includes a means for controlling the dispensing rate of each dispensing means 610 in response to loss of weight sensings of load cell 608 for each bin 600–606. Such a control means is similar to speed control 444 for dispensing means 80 in FIG. 14.

In a variation of the embodiment of FIG. 16, the control means includes a means for operating dispensing means 510 for several cycles in the volumetric metering mode wherein additives are dispensed using a weight per unit time formula instead of load cell 608. The actual weight of each additive concentrate dispensed will be determined by the loss of weight measured by each load cell 608. The actual weight of concentrate lost will be compared by the computer to the theoretical amount dispensed. The discrepancy between the actual and theoretical amounts will then be corrected by adjusting the formula to dispense more accurately the desired amount of additive concentrate. Since the remaining concentrate in each bin has substantially the same density as that already dispensed, the remaining additive can be dispensed accurately by volume.

Correction of the weight per unit time formula used for volumetric dispensing in the metering mode can be used in connection with any embodiment employing a weighing means. For example, volumetric metering into hopper means 122 of FIG. 2 can be adjusted by comparing actual weights of additive concentrate dispensed into compartments 113–116 with the desired amounts determined on a weight per unit time formula. The computer can then correct the formula to account for the density and other properties of the particular batch of additive concentrate being dispensed.

Alternatively, dispensing means 80 can be operated in a weigh mode from the beginning through a major portion of a dispensing cycle for a particular additive concentrate. The load cell 264 monitors the weight of concentrate dispensed at a given speed of screw 90. This information is used by the control means to prepare a weight per unit time formula for volumetric dispensing of the particular additive being dispensed. The dispensing means 80 is then operated in a volumetric metering mode independently of the weighing means for the final portion of the dispensing cycle.

Figure 17:
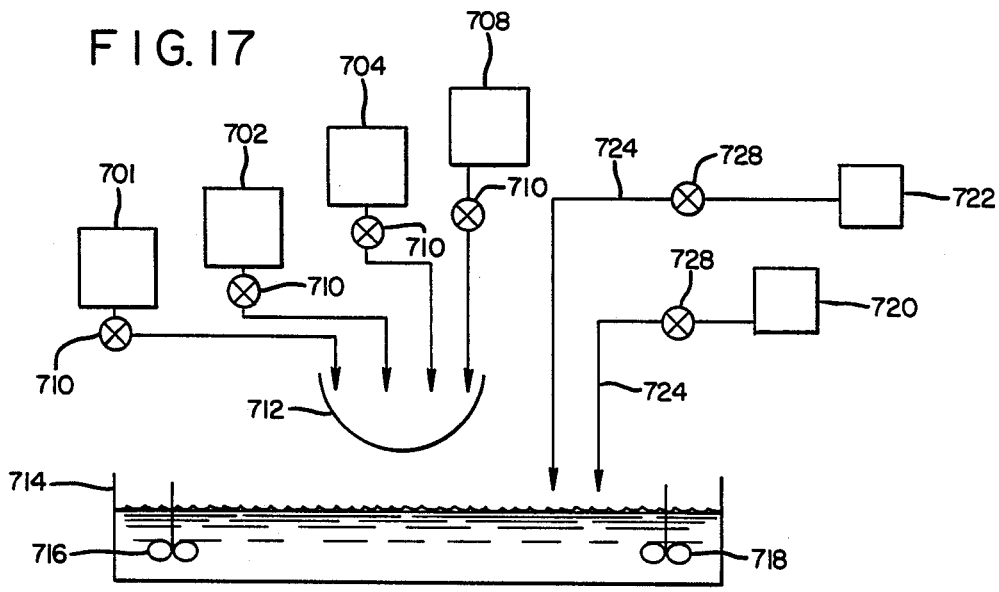
FIG. 17 is a schematic view illustrating a second alternative embodiment of the invention in which dry additive concentrates are dispensed by weight into a weigh hopper while liquid additive concentrates are metered by volume directly into the mixing vessel.

Yet another embodiment of the invention is shown in FIG. 17 which takes advantage of the fact that the density of liquid microingredient concentrates does not vary as greatly as solid microingredients. For this reason, it is possible to accurately meter liquid microingredients by volume while measuring the solid microingredients by weight. In the embodiment of FIG. 17, four dry microingredient containing supply means 701, 702, 704, 708 are shown to each be connected to a dispensing means 710 similar to the dispensing means 80 of apparatus 10. Each of dispensing means 710 conveys dry additive concentrate to a hopper means 712 similar to hopper means 122 in FIG. 5, the hopper means 712 being suspended from a pair of weigh cells. Each additive concentrate is dispensed sequentially into hopper means 712 from containers 701, 702, 704, 708 using dispensing means 710 until a predetermined weight of each concentrate has been sensed by a load cell from which hopper means 712 is suspended. Hopper means 712 is then inverted to separately and simultaneously empty the dry microingredient contents of hopper means 712 into flowing water in mixing vessel 714 which is being agitated by mixers 716, 718.

In the FIG. 17 embodiment, liquid microingredients are separately stored in containers 720, 722 which are provided with tubes 724 that empty into vessel 714. Rotary or piston pumps 728 are interposed in each tube 724 to pump microingredients from containers 720, 722 directly into mixing vessel 714, thereby bypassing entirely hopper means 712.

The control means for the FIG. 17 embodiment may, in some embodiments, include means for selectively operating some dispensing means simultaneously and others sequentially. Pumps 728 for the liquid additive concentrates in containers 720, 722 may, for example, be operated simultaneously with each other and with dispensing means 710. Dispensing means 710 for dry additives should, however, be operated sequentially in this embodiment since the overall weight of hopper means 712 is sensed by the load cells from which the hopper is suspended. If the dry additives were dispensed simultaneously into hopper means 712, it would not be possible to weigh accurately the amount of each additive dispensed. It is through cumulative weight determinations of sequentially dispensed additives that accurate weight determinations are made in the compartmented hopper. A first additive concentrate is delivered into a compartment of the hopper until its load cells register a first predetermined weight, and delivery of the first additive concentrate is stopped. Delivery of a second additive concentrate is then started and continued until the load cells register a second predetermined weight, and so on until predetermined weights of all selected additives have been delivered into the hopper.

In yet other embodiments which are not shown in the drawings, the control means is programmed to operate the dispensing means in an interrupted, on-off-on-off sequence to dispense selected microingredients into a weighing means such as hopper 122. Weight determinations sensed by load cells 264 would only be accepted when the dispensing means switched off during the interrupted sequence. In this manner, weighing inaccuracies caused by movement of the dispensing means or settling of additives would not affect weight determinations.

In a final disclosed embodiment, the isolating means includes programming the control means to prevent operation of any other moving components of apparatus 10 while weight determinations are being made by the weighing means. The operation of dispensing means 80 and mixer blades 182 would, for example, be prevented by the control means while weight determinations were being made by load cell 264.

Having illustrated and described the principles of the invention in several preferred embodiments, it should be apparent to those skilled in the art that the invention can be modified in arrangement and detail without departing from such principles. I claim all modifications coming within the spirit and scope of the following claims.

I claim:

1. An apparatus for measuring, dispensing, and delivering microingredient feed additive concentrates in small but accurate amounts in a liquid carrier slurry into a livestock or poultry feed ration shortly before the delivery of said feed ration to the animals for consumption, said apparatus comprising:
   multiple storage means for storing separately a plurality of different microingredient feed additive concentrates;
   multiple dispensing means for dispensing separately several additive concentrates from said multiple storage means;
   weighing means for determining the weights of said different additive concentrates dispensed;
   isolating means for isolating said weighing means from influences affecting the weighing function of said weighing means so accurate weight determinations are obtained;
   control means for controlling separately the operation of said plural dispensing means in response to weight determinations of said weighing means to control the weight of additive concentrates dispensed;
   receiving means for receiving additive concentrates dispensed from said storage means;
   mixing means for mixing a liquid carrier with the additive concentrates dispensed into said receiving means to form a slurry of said carrier and the dispensed additive concentrates; and
   delivery means for delivering said slurry to a slurry-receiving station for mixing with a feed ration.

2. The apparatus of claim 1 wherein said receiving means includes hopper means positioned functionally between at least some of said dispensing means and said mixing means.

3. The apparatus of claim 2 wherein said weighing means includes means for weighing said hopper means, and said control means includes means for operating sequentially each dispensing means which dispenses into said hopper means and stopping each such dispensing means when said predetermined weight of additive concentrate has been dispensed from a given dispensing means into said hopper means.

4. The apparatus of claim 3 wherein said hopper means includes emptying means for depositing the contents of said hopper means into said mixing means when all said selected additive concentrates have been weighed into said hopper means.

5. The apparatus of claim 4 wherein said emptying means includes means for rotating said hopper means to an upside down position.

6. The apparatus of claim 4 further comprising an air flush means for introducing a stream of air into said hopper means after said hopper means has been emptied.

7. The apparatus of claim 6 wherein said hopper means includes a common hopper and partition means which form a plurality of dry additive concentrate receiving compartments, and a separate air flush means is provided for each compartment.

8. The apparatus of claim 3 wherein said hopper means includes emptying means for depositing the contents of said hopper means into said mixing means.

9. Apparatus according to claim 8 wherein said weighing means includes means for weighing said hopper means and said isolating means includes means for isolating said hopper means from influences affecting the weighing function of said weighing means;
   said emptying means including electrically operated means associated with said hopper means and supplied with electrical power from a power source remote from said hopper means through electrical conductor means;

said hopper isolating means including said electrical conductor means.

10. Apparatus according to claim 8 wherein said isolating means includes transverse and longitudinal vibration and sway dampening means interconnecting said hopper means and a hopper-supporting frame means connected to said weighing means.

11. The apparatus of claim 2 wherein said hopper means includes a common hopper and partition means which form a plurality of additive concentrate receiving compartments within said hopper for preventing intermingling of additive concentrates in said hopper.

12. The apparatus of claim 11 wherein said compartments include dry additive concentrate-receiving compartments and liquid additive concentrate-receiving compartments.

13. The apparatus of claim 2 wherein said mixing means includes a mixing vessel functionally downstream of said hopper means, said dispensing means including liquid additive concentrate dispensing means for dispensing liquid additive concentrates directly into said vessel, bypassing said hopper means.

14. The apparatus of claim 2 wherein said weigh means includes high hopper means for receiving additive concentrates from said dispensing means, and said dispensing means operate sequentially in response to weight gain of said hopper means.

15. The apparatus of claim 1 wherein said mixing means includes a mixing vessel, and said receiving means includes said mixing vessel, said dispensing means including means for dispensing into said vessel.

16. The apparatus of claim 15 wherein said weighing means includes means for weighing said multiple storage means, said control means including means operable to control the operation of each said dispensing means in response to the loss-of-weight of said storage means to control the weight of each additive concentrate dispensed.

17. The apparatus of claim 16 wherein said control means includes means for stopping the operation of each dispensing means when said predetermined weight of a selected additive concentrate is dispensed by each dispensing means.

18. The apparatus of claim 16 wherein said control means includes means for controlling a dispensing rate of each dispensing means in response to loss of weight sensings of said storage means.

19. The apparatus of claim 16 wherein a separate weighing means is provided for each additive, and said control means includes means for operating said dispensing means simultaneously for simultaneously dispensing said additive concentrates.

20. The apparatus of claim 16 wherein said control means includes means for operating said dispensing means to dispense additive concentrate in a volumetric metering mode using a weight per unit time equation, then adjusting the feed rate of said dispensing means based upon loss of weight sensings of said weighing means.

21. The apparatus of claim 1 wherein said control means includes means selectively operable to operate said plural dispensing means either simultaneously or sequentially.

22. The apparatus of claim 1 wherein said control means includes means for selectively operating some dispensing means simultaneously and others sequentially.

23. The apparatus of claim 1 wherein said control means includes a metering mode and a weigh mode, and includes means for operating said dispensing means simultaneously at controlled rates for predetermined periods of time independently of weight determinations of said weighing means in said metering mode, and includes means for operating said dispensing means in response to weight sensings of said weighing means in said weigh mode.

24. The apparatus of claim 23 wherein some dispensing means are operable in said weigh mode while other dispensing means are operable in said metering mode.

25. The apparatus of claim 23 wherein said metering mode of said control means dispenses additive concentrate using a weight per unit time equation, and the feed rate of said dispensing means is adjusted based on loss-of-weight sensings of said weighing means.

26. The apparatus of claim 1 wherein said control means operates said dispensing means sequentially in response to cumulative weight determinations of additive concentrates dispensed, and said control means stops each dispensing means for each separate microingredient when said predetermined weight of that microingredient is sensed.

27. The apparatus of claim 1 wherein said dispensing means operate in response to loss of weight sensings of each separate storage means.

28. The apparatus of claim 1 wherein said isolating means includes a weigh frame for mounting said weighing means and a separate mounting frame for mounting other components of said apparatus that may affect weight determinations of said weighing means.

29. The apparatus of claim 28 wherein said isolating means includes panel means enclosing said frames for insulating said apparatus from environmental influences that may affect weight determinations.

30. The apparatus of claim 28 wherein said isolating means includes elastomeric isolation pads between said weigh frame and a ground support surface for said weigh frame.

31. The apparatus of claim 28 wherein said isolating means includes a weighing means isolator between said weighing means and said weigh frame.

32. The apparatus of claim 1 wherein said isolating means includes first isolator means between said weighing means and a means mounting said weighing means, and a second isolator means between said weigh means and means weighed by said weigh means.

33. The apparatus of claim 32 wherein said weighing means includes a weigh hopper means for receiving additives dispensed from said storage means and said weighing means further includes a load cell, said means mounting said weighing means including said first isolator means mounting said load cell to a support frame while isolating said load cell from movement of said support frame, and a hopper suspension means including said second isolating means suspending said hopper means from said load cell and isolating movement of said hopper means from said load cell.

34. The apparatus of claim 1 wherein said mixing means includes a mixing vessel comprising at least a portion of said receiving means, and flow inducing means for inducing a flow within said vessel.

35. The apparatus of claim 34 wherein said flow inducing means includes variable speed rotary mixing blades, and said control means includes means for operating said mixing blades at a low speed during the depositing of additive concentrates into said vessel and at a higher speed after all additive concentrates have been deposited in said vessel.

36. The apparatus of claim 34 wherein said delivery means includes means for pumping an additive carrier slurry from said vessel through a conduit means to said receiving station.

37. The apparatus of claim 34 wherein said control means includes means for operating said flow inducing means and delivery means at the same time as said dispensing means and weighing means such that a first batch of additive concentrate slurry can be mixed and delivered to a receiving station while a second batch of additive concentrates is dispensed and weighed prior to its deposit into said mixing vessel, said isolating means including means isolating said weighing means from said flow-inducing means and from said delivery means.

38. The apparatus of claim 1 wherein said control means includes at least a portion of said isolating means operable to prevent said dispensing means from operating to dispense a predetermined weight of an additive concentrate during any period of influence of said weighing means that will adversely affect the final determination of said predetermined weight.

39. The apparatus of claim 38 wherein said isolating means includes means for preventing said dispensing means from operating when other components of said apparatus have been actuated by said control means and are moving.

40. The apparatus of claim 1 wherein said isolating means includes a panel enclosure provided in protective relationship around said apparatus, and said isolating means includes means for preventing said dispensing means from operating when said panel enclosure has been taken out of protective relationship around said apparatus.

41. The apparatus of claim 1 wherein said isolating means includes means for delaying a weight determination by said weighing means until movement of said weighing means, induced by delivery of additive concentrate into said weighing means, has substantially subsided.

42. The apparatus of claim 1 wherein said control means includes means cooperable with said weighing means for operating each dispensing means at a first speed from the beginning through a major portion of a dispensing cycle and at a second speed near the end of a dispensing cycle as determined by said weighing means measuring a weight of an additive concentrate approaching said predetermined weight, said control means being operable to stop a given dispensing means upon the dispensing of said predetermined weight.

43. The apparatus of claim 1 wherein said weighing means includes means for weighing separately said multiple storage means, said control means including means operable to control separately the operation of each said dispensing means in response to the loss-of-weight of each storage means to control separately said weight of each additive concentrate dispensed.

44. The apparatus of claim 1 wherein said control means includes a metering mode and a weigh mode, and includes means for operating said dispensing means in a weigh mode from the beginning through a major portion of a dispensing cycle for a given additive concentrate, said control means further including means for operating said dispensing means in said metering mode through the remaining portion of said cycle.

45. The apparatus of claim 1 wherein said isolating means includes panel means enclosing supporting frame means mounting said storage means, dispensing means, weighing means, and receiving means, said panel means being operable to insulate said apparatus from environmental influences that may affect weight determinations.

46. Apparatus according to claim 45 wherein said weighing means and receiving means include a weigh hopper means for receiving additives dispensed from said storage means and wherein said weighing means further includes a load cell;
means including said isolating means mounting said weighing means to said supporting frame means;
said isolating means including a first isolator means mounting said load cell to said supporting frame means while isolating said load cell from movement of said supporting frame means, and a hopper suspension means including a second isolator means suspending said hopper means from said load cell and isolating movement of said hopper means from said load cell.

47. A method of dispensing and delivering microingredient feed additives into a livestock feed ration shortly before delivering the feed ration to the livestock for consumption, comprising the steps:
storing separately multiple said additives in concentrate form;
dispensing predetermined weights of selected said additive concentrates into a liquid carrier with no substantial intermixing of the additive concentrates before they enter the liquid carrier;
intermixing the additive concentrates in the liquid carrier to dilute, disperse, and suspend them and form a liquid carrier-additive slurry;
directing the slurry to a receiving station while maintaining the suspension and dispersion of the additives until delivered into a feed ration; and
determining the predetermined weights of selected additives by weighing each additive sequentially and cumulatively in a common weighing container while maintaining separation of the different concentrates in said container.

48. The method of claim 47 wherein said dispensing step comprises emptying the concentrates from said container into the carrier after the predetermined weights of all additives in said container have been determined.

49. The method of claim 47 wherein the step of weighing each additive sequentially and cumulatively includes delivering a first additive concentrate into said container until said container registers a first predetermined weight and thereupon stopping the delivery of said first additive and starting the delivery of a second additive concentrate and continuing until said container registers a second predetermined weight, and so on until selected weights of all selected additives have been delivered into said container.

50. A method of dispensing and delivering microingredient feed additives into a livestock feed ration shortly before delivering the feed ration to the livestock for consumption, comprising the steps:
storing separately multiple said additives in concentrate form;
dispensing predetermined weights of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration; and determining the predetermined weights of different additives dispensed by measuring the loss of weight of the additive storage source for each additive dispensed.

51. An apparatus for measuring, dispensing, and delivering microingredient feed additive concentrates in small but accurate proportions in a liquid carrier slurry into a livestock or poultry feed ration shortly before the delivery of said feed ration to the animals for consumption, said apparatus comprising:

a support frame means;

multiple storage means on said support frame means for storing separately a plurality of different microingredient feed additive concentrates;

a plurality of separate dispensing means on said support frame means, one for each said storage means, for dispensing separately and without intermingling additive concentrates from said multiple storage means;

a hopper means carried by said support frame means in additive-receiving relationship to said dispensing means, said hopper means including hopper discharge means for discharging additives therefrom;

a hopper flush means for introducing a stream of flush fluid into said hopper means;

a mixing vessel in additive-receiving relationship to said hopper means for receiving additive concentrates from said hopper means and liquid carrier from a remote source;

flow-inducing means for inducing a flow of liquid within said mixing vessel;

delivery means for delivering a slurry of liquid carrier and additive concentrates from said mixing vessel to a receiving station for mixing with a feed ration at a location remote from said mixing vessel;

weighing means on said support frame means, said weighing means including said hopper means, for weighing predetermined weights of said different additive concentrates dispensed into said hopper means by said dispensing means;

vessel flush means for introducing a flow of flush liquid into said mixing vessel for removing residues of additive concentrates therefrom upon removal of slurry from said mixing vessel by said delivery means;

and control means for:

(a) starting the operation of selected ones of said plural dispensing means to dispense selected additive concentrates from said storage means into said hopper means;

(b) stopping the operation of each said dispensing means when a predetermined weight of a selected additive concentrate has been dispensed by said dispensing means into said hopper means as determined by said weighing means;

(c) before operating said discharge means, filling the mixing vessel with a predetermined volume of liquid carrier;

(d) operating said discharge means after said selected concentrates have been weighed in said hopper means to discharge the contents of said hopper means into the liquid carrier within said mixing vessel;

(e) operating said hopper flush means upon discharge of additives from said hopper means to flush residues of additive concentrates from said hopper means into the liquid carrier within said mixing vessel;

(f) operating said flow inducing means to mix the additive concentrates and liquid carrier within the mixing vessel and form said slurry;

(g) after forming the slurry within said mixing vessel, operating the delivery means to discharge the slurry from the mixing vessel and deliver it to said receiving station; and (h) during operation of said delivery means, operating said vessel flush means to flush additive concentrate residue from the mixing vessel and deliver the residue and flush liquid to the receiving station for delivery into a feed ration with the slurry.

52. The apparatus of claim 51 wherein said support frame means includes a mounting frame and a separate weigh frame spaced from said mounting frame, said weighing means being supported by said weigh frame, said storage and dispensing means being supported by said mounting frame, said mixing vessel being spaced from said weigh frame.

53. The apparatus of claim 52 wherein said weigh frame and said mounting frame include elastomeric isolation pads mounting said frames to an underlying support surface.

54. The apparatus of claim 52 wherein said weighing means includes said hopper means and a pair of load cells, one suspending each end of said hopper means from said weigh frame.

55. The apparatus of claim 54 including the first isolator means isolating each load cell from said hopper means and second isolator means isolating each load cell from said weigh frame.

56. The apparatus of claim 54 including means for rotating said hopper means between an upright additive-receiving position and an inverted additive-discharge position while said hopper means is suspended from said pair of load cells.

57. The apparatus of claim 54 including anti-sway means interconnecting said hopper means and said weigh frame to restrain said hopper means against movements in a plane normal to the plane of suspension of said hopper means.

58. The apparatus of claim 54 wherein said weigh frame includes isolation pads mounting said weigh frame to an underlying support surface.

59. The apparatus of claim 54 including panel enclosure means for shielding said weigh frame from ambient forces that might otherwise induce movement in said weigh frame, said panel enclosure means being connected to said mounting frame and spaced from said weigh frame.

60. The apparatus of claim 51 wherein said hopper means includes a weigh hopper partitioned into a plurality of separate additive-receiving compartments, said separate dispensing means being disposed to dispense into said different compartments.

61. The apparatus of claim 60 wherein said hopper flush means includes means for introducing a stream of air into said separate compartments to flush said compartments of additive residues.

62. The apparatus of claim 51 wherein said hopper means includes a weigh hopper mounted for movement between an upright additive-receiving position for receiving additive concentrates from said dispensing means and an inverted additive-discharge position for discharging additive concentrates into said mixing vessel.

63. A method of dispensing and delivering microingredient feed additives into a livestock feed ration shortly before delivering the feed ration to the livestock for consumption, comprising the steps:

storing separately multiple said additives in concentrate form;

dispensing predetermined weights of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration; and determining the predetermined weights of selected additives by the step of measuring the predetermined weights while isolating the measuring means from influences that would affect the measuring function so that accurate weight determinations are obtained.

64. The method of claim 63 including measuring the prredetermined weights within an accuracy of at least ± one gram.

65. A method of dispensing and delivering microingredient feed additives into a livestock feed ration shortly before delivering the feed ration to the livestock for consumption, comprising the steps:

storing separately multiple said additives in concentrate form;

dispensing predetermined weights of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration; and determining the predetermined weights by weighing at least some of the additive concentrates dispensed within a weighing container means, and after all of the some concentrates are weighed discharging them into the liquid carrier.

66. The method of claim 65 including flushing the container means with fluid during the discharge of additive concentrates from the container means into the liquid carrier to flush additive concentrate residue from the container means into the liquid carrier to inhibit cross-contamination of successive additive concentrate formulations.

67. A method of dispensing and delivering microingredient feed additives into a livestock feed ration shortly before delivering the feed ration to the livestock for consumption, comprising the steps:

storing separately multiple said additives in concentrate form;

dispensing predetermined weights of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration; and determining the predetermined weights by the step of weighing at least all of the dry additives dispensed before dispensing any of the selected and weighed dry additives into the liquid carrier.

68. A method of dispensing and delivering microingredient feed additives into a livestock feed ration shortly before delivering the feed ration to the livestock for consumption, comprising the steps:

storing separately multiple said additives in concentrate form;

dispensing predetermined weights of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration; and determining the predetermined weights by weighing at least some of the dispensed additives separately in a weighing means before dispensing them into the liquid carrier, and then discharging all of the some additives weighed in the weighing means simultaneously into the liquid carrier.

69. A method of dispensing and delivering microingredient feed additives into a livestock feed ration shortly before delivering the feed ration to the livestock for consumption, comprising the steps:

storing separately multiple said additives in concentrate form;

dispensing predetermined weights of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration; and determining the predetermined weights in weighing means and isolating the weighing means from the dispensing means and from movements induced by ambient influences while performing the weighing function to enhance the accuracy of said function.

70. A method of dispensing and delivering formulations of microingredient feed additives into a livestock feed ration at a feedlot shortly before delivering the feed ration to the livestock for consumption, comprising the steps:

storing separately multiple said additives in concentrate form;

weighing predetermined amounts of selected said additives, with no substantial intermixing of the selected additives during the weighing process;

discharging the weighed amounts of the selected additives into a predetermined volume of liquid carrier;

intermixing the liquid carrier and weighed amounts of selected additives to form a slurry; and after the slurry is formed, conveying the slurry to a receiving station while maintaining the weighed amounts of additive concentrates in suspension and dispersion until the slurry is delivered into a feed ration.

71. The method of claim 57 including
containing the liquid carrier within a mixing vessel;
weighing the predetermined amounts of at least some selected additives in weighing container means;
after all weighing is completed in the weighing container means, discharging all of the weighed amounts of said some selected additives simultaneously from the weighing container means into said liquid carrier within the mixing vessel;
after forming the slurry within the mixing vessel and while conveying the slurry to the receiving station, flushing the mixing vessel with a flush liquid that is the same material as the liquid carrier to flush additive residue from the mixing vessel;
and conveying the flush liquid with said residue from the mixing vessel to the receiving station for delivery into a feed ration with the slurry.

72. The method of claim 71 including flushing the weighing container means with fluid during discharge of the weighed amounts from the container means to flush residues of the weighed amounts of additives from the container means into the liquid carrier within the mixing vessel.

73. The method of claim 70 including discharging all of the different weighed additives simultaneously into the liquid carrier with no substantial intermixing of the different weighed additives before they enter the carrier.

74. An apparatus for measuring, dispensing, and delivering microingredient feed additive concentrates in small but accurate amounts in a liquid carrier slurry into a livestock or poultry feed ration shortly before the delivery of said feed ration to the animals for consumption, said apparatus comprising:
multiple storage means for storing separately a plurality of different microingredient feed additive concentrates;
multiple dispensing means for dispensing additives separately from said multiple storage means;
weighing means for determining the weights of selected additives dispensed by said dispensing means from said storage means;
a mixing vessel for receiving a liquid carrier and the dispensed and weighed additive concentrates;
flow-inducing means for inducing a flow of liquid carrier within said mixing vessel and thereby mixing said carrier with the dispensed additive concentrates to form a slurry;
delivery means for delivering said slurry from said mixing vessel to a remote slurry-receiving station for mixing with a feed ration; and
control means operable to:
(a) control separately the operation of said plural dispensing means in response to weight determinations of said weighing means to control the weight of additive concentrates dispensed;
(b) operate said flow-inducing means to cause a positive intermixing of the dispensed additive concentrates and the liquid carrier within said mixing vessel before discharge of liquid carrier from said vessel;
(c) operate said delivery means to deliver slurry to said receiving station after the slurry is formed in said mixing vessel by said flow-inducing means.

75. The apparatus of claim 74 wherein said weighing means includes a weigh hopper means for receiving additive concentrates dispensed by said dispensing means, said weigh hopper means including discharge means for discharging the weighed additive concentrates from said hopper means, and hopper flush means for flushing said hopper means of additive concentrate residue into said mixing vessel upon the discharge of additive concentrates from said hopper means.

76. The apparatus of claim 75 wherein said hopper flush means includes means for flushing said hopper means with a stream of air.

77. The apparatus of claim 75 including vessel flush means for flushing said mixing vessel with liquid, said vessel flush means being operable in conjunction with said delivery means such that flush liquid bearing additive residue is delivered from said mixing vessel to said receiving station by said delivery means for delivery into a feed ration with said slurry.

78. The apparatus of claim 74 wherein said control means is operable to operate said multiple dispensing means sequentially to deliver dispensed additive concentrates sequentially into said weigh hopper means and is further operable to weigh said dispensed additives sequentially and cumulatively in said weigh hopper means, said dispensing means being operable to dispense additives into said weigh hopper means with no substantial intermixing between different additives before discharge of said additives into said mixing vessel.

79. The apparatus according to claim 74 wherein said weighing means comprises a weigh hopper means and said multiple dispensing means and control means are operable to dispense the selected additives separately into said weigh hopper means with no substantial intermixing of said additives, said hopper means including means for discharging the weighed additives simultaneously from said hopper means into the liquid carrier within said mixing vessel with no substantial intermixing of said additives before they enter said liquid carrier, said flow-inducing means being operable to intermix said additives and liquid carrier within said mixing vessel to form a slurry before operation of said delivery means to deliver said slurry from said vessel.

80. The apparatus according to claim 74 including hopper flush means operable upon discharge of additives from said hopper means to flush additive residue from said hopper means into said mixing vessel, and vessel flush means operable upon discharge of slurry from said mixing vessel to flush the mixing vessel with liquid to carry additive residue from said mixing vessel to said receiving station.

81. The apparatus of claim 74 wherein said control means includes means for operating said flow-inducing means and said delivery means at the same time as said dispensing means and said weighing means such that a first batch of additive concentrate slurry can be mixed and delivered to a receiving station while a second batch of additive concentrates is dispensed and weighed prior to its deposit into said mixing vessel.

82. In an apparatus for measuring, dispensing, and delivering microingredient feed additive concentrates in small but accurate amounts into a livestock or poultry feed ration shortly before the delivery of said feed ration to the animals for consumption, said apparatus including a means for measuring the quantities of several different microingredients feed additive concentrates dispensed by weight, the improvement comprising:
- a weigh frame,
- a weigh hopper,
- means for rotating said hopper from an upright position for receiving additive concentrates to be weighed to an inverted position for discharging concentrates from said hopper after weighing;
- a pair of load cells one suspending each end of said weigh hopper from said weigh frame;
- an isolator means isolating said load cells from said weigh frame and from said weigh hopper.

83. The apparatus of claim 82 wherein said weigh hopper is partitioned into separate additive concentrate receiving compartments such that different additive concentrates can be dispensed into the different compartments for maintaining segregation between the different additive concentrates during the weighing process.

84. The apparatus of claim 83 wherein said separate compartments include dry additive-receiving components and liquid additive-receiving compartments.

85. The apparatus of claim 82 including hopper flush means operable when said hopper is in said inverted position to flush said compartments with streams of air to remove additive concentrate residue from said compartments before said hopper returns to its upright position.

86. The apparatus of claim 82 including isolator means isolating said weigh frame from its underlying support surface.

87. The apparatus of claim 82 wherein said weigh frame is mounted within and spaced from a surrounding component mounting frame, and side and top panel means mounted to said component mounting frame shielding said weigh frame from ambient motion-inducing forces.

88. Apparatus according to claim 82 wherein said means for rotating includes electrically operated means associated with said weigh hopper and suspended with said weigh hopper from said pair of load cells.

89. A method of dispensing and delivering microingredient feed additives into a livestock feed ration shortly before delivering the feed ration to the livestock for consumption, comprising the steps:
- storing separately multiple said additives in concentrate form;
- dispensing predetermined weights of selected said additive concentrates into a liquid carrier with no substantial intermixing of the additive concentrates before they enter the liquid carrier;
- intermixing the additive concentrates in the liquid carrier to dilute, disperse, and suspend them and form a liquid carrier-additive slurry;
- directing the slurry to a receiving station while maintaining the suspension and dispersion of the additives until delivered into a feed ration;
- the step of dispensing predetermined weights of selected said additive concentrates including the weighing of multiple additive concentrates before dispensing the multiple weighed concentrates into the liquid carrier.

90. The method of claim 89 including weighing at least some of the additive concentrates to be dispensed sequentially and cumulatively in a common weighing container before dispensing them into the liquid carrier.

91. An apparatus for measuring, dispensing, and delivering microingredient feed additive concentrates in small but accurate proportions in a liquid carrier slurry into a livestock or poultry feed ration shortly before the delivery of said feed ration to the animals for consumption, said apparatus comprising:
- a support frame means;
- multiple storage means on said support frame means for storing separately a plurality of different microingredient feed additive concentrates;
- a plurality of separate dispensing means on said support frame means, one for each said storage means, for dispensing separately and without intermingling additive concentrates from said multiple storage means;
- hopper means, including multiple hopper container means, carried by said support frame means in additive-receiving relationship to said dispensing means, said hopper means including hopper discharge means for discharging additives from said multiple hopper container means;
- a mixing vessel in additive-receiving relationship to said hopper means for receiving additive concentrates from said hopper container means and liquid carrier from a remote source;
- flow-inducing means for inducing a flow of liquid carrier within said mixing vessel;
- delivery means for delivering a slurry of liquid carrier and additive concentrates from said mixing vessel to a receiving station for mixing with a feed ration at a location remote from said mixing vessel;
- weighing means on said support frame means for weighing predetermined weights of said different additive concentrates dispensed into said multiple hopper container means by said dispensing means;
- vessel flush means for introducing a flow of flush liquid into said mixing vessel for removing residues of additive concentrates therefrom;
- and control means for:
  (a) starting the operation of selected ones of said plural dispensing means to dispense selected additive concentrates from said storage means into said hopper means;
  (b) stopping the operation of a selected said dispensing means when a predetermined weight of a selected additive concentrate has been dispensed by said selected dispensing means into a said hopper container means as determined by said weighing means;
  (c) operating said hopper discharge means to discharge the contents of a hopper container means after a selected concentrate has been weighed in said hopper container means to discharge the contents of the hopper container means into said mixing vessel;
  (d) operating said flow inducing means to mix additive concentrates discharged from the hopper means and liquid carrier within the mixing vessel and form said slurry;
  (e) operating the delivery means to discharge the slurry from the mixing vessel and deliver it to said receiving station; and
  (f) during operation of said delivery means, operating said vessel flush means to flush additive concentrate residue from the mixing vessel and deliver the residue and flush liquid to the receiving station for delivery into a feed ration with the slurry.

92. A method of dispensing and delivering microingredient feed additives into a livestock feed ration shortly before delivering the feed ration to the livestock for consumption, comprising the steps:

storing separately multiple said additives in concentrate form;

dispensing predetermined weights of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration; and determining the predetermined weights by weighing at least some of the selected additive concentrates dispensed within weighing container means, and after said some concentrates are weighed, discharging them into the liquid carrier.

93. A method of dispensing and delivering formulations of microingredient feed additives into a livestock feed ration at a feedlot shortly before delivering the feed ration to the livestock for consumption, comprising the steps:

storing separately multiple said additives in concentrate form;

weighing predetermined amounts of selected said additives, with no substantial intermixing of the selected additives during the weighing process;

discharging the weighed amounts of the selected additives into a mixing vessel;

introducing a liquid carrier into the mixing vessel;

intermixing the liquid carrier and weighed amounts of selected additives in the mixing vessel to form a slurry within the mixing vessel; and conveying the slurry to a receiving station while maintaining the weighed amounts of additive concentrates in suspension and dispersion until the slurry is delivered into a feed ration.

94. A method of dispensing and delivering microingredient feed additives into a livestock feed ration shortly before delivering the feed ration to the livestock for consumption, comprising the steps:

storing separately multiple said additives in concentrate form;

dispensing predetermined weights of selected said additive concentrates into a liquid carrier with no substantial intermixing of the additive concentrates before they enter the liquid carrier;

intermixing the additive concentrates in the liquid carrier to dilute, disperse, and suspend them and form a liquid carrier-additive slurry;

directing the slurry to a receiving station while maintaining the suspension and dispersion of the additives until delivered into a feed ration; and causing said intermixing to occur within a mixing vessel by positively intermixing the liquid carrier and additive concentrates within the mixing vessel before directing the slurry to the receiving station.

* * * * *

UNITED STATES PATENT AND TRADEMARK OFFICE
CERTIFICATE OF CORRECTION

PATENT NO. : 4,733,971

DATED : March 29, 1988

INVENTOR(S) : WILLIAM C. PRATT

It is certified that error appears in the above-identified patent and that said Letters Patent is hereby corrected as shown below:

In the Specification:

Column 3, line 26, change "weight" to --weigh--.

Column 3, line 30, change "weight" to --weigh--.

Column 5, line 22, change "79" (first occurrence) to --77--.

Column 6, line 11, change "weight" to --weigh--.

Column 11, line 55, change "acutally" to --actually--.

Column 12, line 38, after "68-74", insert --to--.

Column 14, line 61, change "stop" to --step--.

Column 15, line 63, change "determined" to --terminated--.

Column 16, line 8, change "concentration" to --concentrate--.

Column 17, line 1, change "242" to --424--.

Column 17, line 19, change "weight" to --weigh--.

Column 17, line 64, change "113-115" to --113-116--.

Column 18, line 42, change "if" to --is--.

Column 18, line 68, change "354" to --534--.

Column 19, line 52, change "swtch" to --switch--.

In the Claims:

Claim 14, column 23, line 27, change "high" to --weigh--.

Claim 55, column 28, line 35, delete "the" after "including".

UNITED STATES PATENT AND TRADEMARK OFFICE
CERTIFICATE OF CORRECTION

PATENT NO. : 4,733,971

DATED : March 29, 1988

INVENTOR(S) : WILLIAM C. PRATT

It is certified that error appears in the above-identified patent and that said Letters Patent is hereby corrected as shown below:

Claim 64, column 29, line 29, change "prrdetermined" to --predetermined--.

Claim 71, column 31, line 6 change "57" to --70--.

Claim 82, column 33, line 1, change "microingredients" to --microingredient--.

Claim 84, column 33, lines 22-23, change "components" to --compartments--.

Signed and Sealed this

Twenty-seventh Day of September, 1988

Attest:

DONALD J. QUIGG

*Attesting Officer*     Commissioner of Patents and Trademarks